US010757295B2

(12) United States Patent
Maeda

(10) Patent No.: US 10,757,295 B2
(45) Date of Patent: Aug. 25, 2020

(54) PRINTING APPARATUS, CONTROL METHOD FOR PRINTING APPARATUS, AND STORAGE MEDIUM FOR GENERATING AN IMAGE FORMING CONDITION BASED ON A READING RESULT

(71) Applicant: CANON KABUSHIKI KAISHA, Tokyo (JP)

(72) Inventor: Yuuki Maeda, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/383,432

(22) Filed: Apr. 12, 2019

(65) Prior Publication Data
US 2019/0246004 A1 Aug. 8, 2019

Related U.S. Application Data

(62) Division of application No. 15/392,182, filed on Dec. 28, 2016, now Pat. No. 10,306,103, which is a (Continued)

(30) Foreign Application Priority Data

Dec. 9, 2014 (JP) .................................. 2014-249412

(51) Int. Cl.
H04N 1/387 (2006.01)
H04N 1/00 (2006.01)
(Continued)

(52) U.S. Cl.
CPC .......... *H04N 1/3873* (2013.01); *B41J 29/393* (2013.01); *G06K 15/027* (2013.01);
(Continued)

(58) Field of Classification Search
CPC .. H04N 1/3873; H04N 1/0032; H04N 1/0057; H04N 1/00694; H04N 1/00708;
(Continued)

(56) References Cited

U.S. PATENT DOCUMENTS

2002/0023071 A1* 2/2002 Takahashi ............ H04N 1/2179
2006/0221411 A1 10/2006 Aoki
(Continued)

FOREIGN PATENT DOCUMENTS

CN 101204888 A 6/2008
CN 101654013 A 2/2010
(Continued)

*Primary Examiner* — Iriana Cruz
(74) *Attorney, Agent, or Firm* — Canon U.S.A., Inc. IP Division

(57) ABSTRACT

A control method in a printing apparatus includes printing, by a printing unit, an adjustment image for adjusting a printing position on a sheet, conveying, by a conveying unit, the sheet on which the adjustment image is printed, reading, by a reading unit, an image to generate image data, the reading unit being executable to perform reading by a first reading method for reading an image of a sheet without conveying the sheet or a second reading method for reading the image of the sheet while conveying the sheet, and determining, based on that a type of the sheet on which the adjustment image is to be printed is a specific type, to read the adjustment image by the first reading method.

12 Claims, 17 Drawing Sheets

Related U.S. Application Data division of application No. 14/958,669, filed on Dec. 3, 2015, now Pat. No. 9,560,229.

(51) Int. Cl.
*G06K 15/02* (2006.01)
*B41J 29/393* (2006.01)

(52) U.S. Cl.
CPC .......... *H04N 1/0032* (2013.01); *H04N 1/0057* (2013.01); *H04N 1/00694* (2013.01); *H04N 1/00708* (2013.01); *H04N 1/00724* (2013.01); *H04N 1/00734* (2013.01); *H04N 1/00745* (2013.01); *H04N 1/00779* (2013.01); *H04N 1/00795* (2013.01); *H04N 1/00806* (2013.01); *H04N 1/3878* (2013.01); *H04N 2201/0081* (2013.01); *H04N 2201/0082* (2013.01); *H04N 2201/3269* (2013.01)

(58) Field of Classification Search
CPC .......... H04N 1/00724; H04N 1/00734; H04N 1/00745; H04N 1/00779; H04N 1/00795; H04N 1/00806; H04N 1/3878; H04N 2201/0081; H04N 2201/0082; H04N 2201/3269; H04N 1/00045; B41J 29/393; G06K 15/027

See application file for complete search history.

(56) References Cited

U.S. PATENT DOCUMENTS

| | | | | |
|---|---|---|---|---|
| 2013/0222461 A1* | 8/2013 | Kaszynski | ............. | B41J 2/2128 347/19 |
| 2014/0233071 A1* | 8/2014 | Kido | ................. | H04N 1/00013 358/3.26 |

FOREIGN PATENT DOCUMENTS

| | | |
|---|---|---|
| JP | H11-095617 A | 4/1999 |
| JP | 2005-029378 A | 2/2005 |
| JP | 2005176045 A | 6/2005 |
| JP | 2006-050346 A | 2/2006 |
| JP | 2009-077068 A | 4/2009 |
| JP | 2011-061612 A | 3/2011 |
| JP | 2013-222307 A | 10/2013 |

* cited by examiner

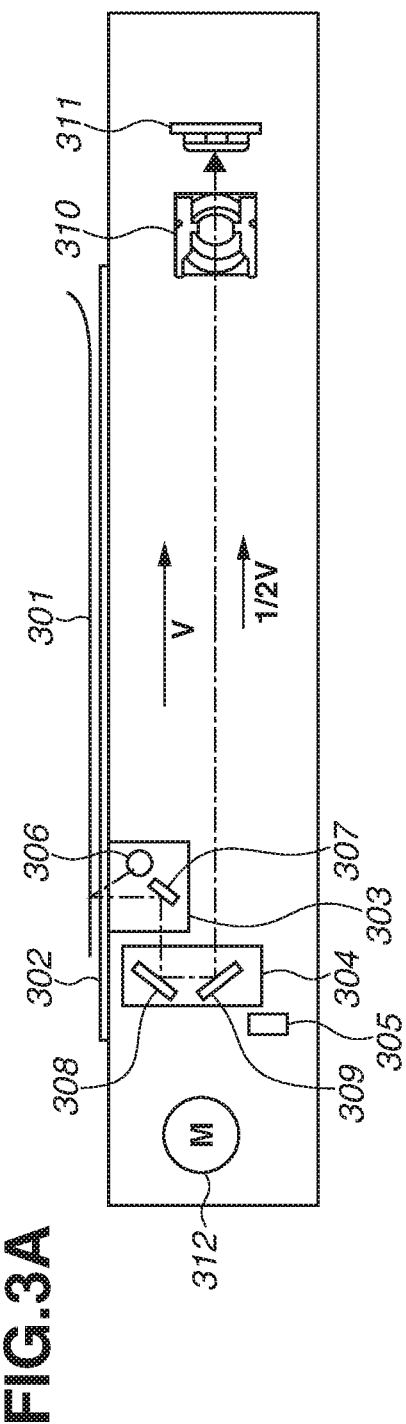
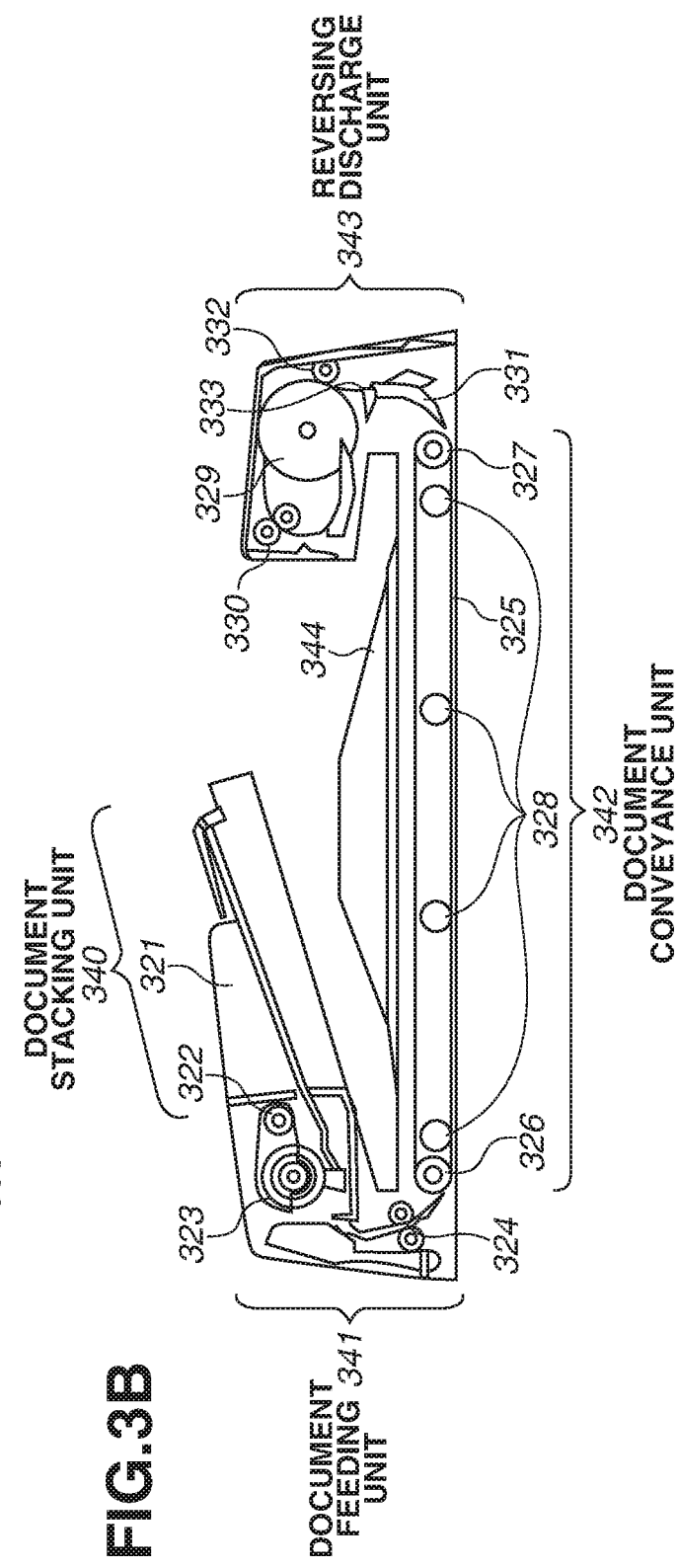
FIG.3A
FIG.3B

FIG. 4

| SHEET NAME | SHEET LENGTH IN SUB SCANNING DIRECTION (mm) | SHEET LENGTH IN MAIN SCANNING DIRECTION (mm) | GRAMMAGE (g/m²) | SURFACE PROPERTY | COLOR | PREPRINTED PAPER | AMOUNT OF SHIFT IN PRINTING POSITION (FRONT SURFACE) | AMOUNT OF SHIFT IN PRINTING POSITION (BACK SURFACE) |
|---|---|---|---|---|---|---|---|---|
| ABC PAPER CO., RECYCLED 1 | 210 | 297 | 75 | PLAIN PAPER | WHITE | NO | LEAD POSITION: 0.3 mm<br>SIDE POSITION: -0.1 mm<br>MAIN SCANNING MAGNIFICATION: -0.02%<br>SUB SCANNING MAGNIFICATION: +0.01% | LEAD POSITION: 0.2 mm<br>SIDE POSITION: 0.1 mm<br>MAIN SCANNING MAGNIFICATION: 0.02%<br>SUB SCANNING MAGNIFICATION: -0.03% |
| ABC PAPER CO., RECYCLED 2 | 297 | 420 | 75 | PLAIN PAPER | WHITE | NO | LEAD POSITION: 0.0 mm<br>SIDE POSITION: -0.0 mm<br>MAIN SCANNING MAGNIFICATION: +0.00%<br>SUB SCANNING MAGNIFICATION: +0.00% | LEAD POSITION: 0.0 mm<br>SIDE POSITION: -0.0 mm<br>MAIN SCANNING MAGNIFICATION: +0.00%<br>SUB SCANNING MAGNIFICATION: +0.00% |
| DEF PAPER CO., EMBOSSED A-1 | 216 | 279 | 150 | EMBOSSED | WHITE | NO | LEAD POSITION: 0.5 mm<br>SIDE POSITION: -0.5 mm<br>MAIN SCANNING MAGNIFICATION: +0.02%<br>SUB SCANNING MAGNIFICATION: +0.02% | LEAD POSITION: -0.3 mm<br>SIDE POSITION: 0.5 mm<br>MAIN SCANNING MAGNIFICATION: +0.01%<br>SUB SCANNING MAGNIFICATION: -0.03% |
| DEF PAPER CO., COATED PAPER P-1 | 279 | 432 | 128 | TWO-SIDED COATED | WHITE | NO | LEAD POSITION: 0.4 mm<br>SIDE POSITION: -0.2 mm<br>MAIN SCANNING MAGNIFICATION: +0.12%<br>SUB SCANNING MAGNIFICATION: +0.08% | LEAD POSITION: -0.2 mm<br>SIDE POSITION: 0.6 mm<br>MAIN SCANNING MAGNIFICATION: -0.02%<br>SUB SCANNING MAGNIFICATION: -0.01% |
| XYZ PAPER CO., COLOR 81 | 210 | 297 | 75 | PLAIN PAPER | ORANGE | NO | LEAD POSITION: 0.0 mm<br>SIDE POSITION: -0.0 mm<br>MAIN SCANNING MAGNIFICATION: +0.00%<br>SUB SCANNING MAGNIFICATION: +0.00% | LEAD POSITION: 0.0 mm<br>SIDE POSITION: -0.0 mm<br>MAIN SCANNING MAGNIFICATION: +0.00%<br>SUB SCANNING MAGNIFICATION: +0.00% |
| XYZ PAPER CO., COLOR 82 | 210 | 297 | 75 | PLAIN PAPER | PINK | NO | LEAD POSITION: 0.0 mm<br>SIDE POSITION: -0.0 mm<br>MAIN SCANNING MAGNIFICATION: +0.00%<br>SUB SCANNING MAGNIFICATION: +0.00% | LEAD POSITION: 0.0 mm<br>SIDE POSITION: -0.0 mm<br>MAIN SCANNING MAGNIFICATION: +0.00%<br>SUB SCANNING MAGNIFICATION: +0.00% |
| FGH PAPER CO., GRAPH 75 | 210 | 297 | 75 | PLAIN PAPER | WHITE | YES | LEAD POSITION: 0.0 mm<br>SIDE POSITION: -0.0 mm<br>MAIN SCANNING MAGNIFICATION: +0.00%<br>SUB SCANNING MAGNIFICATION: +0.00% | LEAD POSITION: 0.0 mm<br>SIDE POSITION: -0.0 mm<br>MAIN SCANNING MAGNIFICATION: +0.00%<br>SUB SCANNING MAGNIFICATION: +0.00% |
| FGH PAPER CO., PLAIN PAPER 2 | 210 | 297 | 75 | PLAIN PAPER | WHITE | NO | LEAD POSITION: -0.03 mm<br>SIDE POSITION: -0.07 mm<br>MAIN SCANNING MAGNIFICATION: +0.06%<br>SUB SCANNING MAGNIFICATION: -0.01% | LEAD POSITION: -0.03 mm<br>SIDE POSITION: -0.10 mm<br>MAIN SCANNING MAGNIFICATION: +0.04%<br>SUB SCANNING MAGNIFICATION: +0.02% |

FIG.5A

EDITING OF SHEET MANAGEMENT TABLE

| SHEET NAME | SHEET LENGTH IN SUB SCANNING DIRECTION (mm) | SHEET LENGTH IN MAIN SCANNING DIRECTION (mm) | GRAMMAGE (g/m²) | SURFACE PROPERTY | COLOR |
|---|---|---|---|---|---|
| ABC PAPER CO., RECYCLED 1 | 210 | 297 | 75 | PLAIN PAPER | WHITE |
| ABC PAPER CO., RECYCLED 2 | 297 | 420 | 75 | PLAIN PAPER | WHITE |
| DEF PAPER CO., EMBOSSED A-1 | 216 | 279 | 150 | EMBOSSED | WHITE |
| DEF PAPER CO., COATED PAPER P-1 | 279 | 432 | 128 | TWO-SIDED COATED | WHITE |
| XYZ PAPER CO., COLOR 81 | 210 | 297 | 75 | PLAIN PAPER | ORANGE |
| XYZ PAPER CO., COLOR 82 | 210 | 297 | 75 | PLAIN PAPER | PINK |

[ADD NEW SHEET] — 501  
[EDIT] — 502  
[DELETE]  
[ADJUST PRINTING POSITION] — 503

EDITING OF SHEET ATTRIBUTES

| | |
|---|---|
| SHEET NAME | XYZ PAPER CO., COLOR 81 |
| SHEET LENGTH IN SUB SCANNING DIRECTION (mm) | 210 |
| SHEET LENGTH IN MAIN SCANNING DIRECTION (mm) | 297 |
| GRAMMAGE (g/m²) | 75 |
| SURFACE PROPERTY | PLAIN PAPER ▼ |
| COLOR | WHITE ▼ |
| PREPRINTED PAPER | ✓ |

[END EDITING] — 511  
[CANCEL]

| | MEASUREMENT VALUE | IDEAL VALUE | AMOUNT OF SHIFT IN PRINTING POSITION |
|---|---|---|---|
| LEAD POSITION (FRONT SURFACE) | $\dfrac{(c)+(e)}{2}$ | 1 cm | MEASUREMENT VALUE − IDEAL VALUE |
| SIDE POSITION (FRONT SURFACE) | $\dfrac{(f)+(j)}{2}$ | 1 cm | MEASUREMENT VALUE − IDEAL VALUE |
| MAIN SCANNING MAGNIFICATION (FRONT SURFACE) | $\dfrac{((b)-(d)-(f)) + ((b)-(h)-(j))}{2}$ | (SHEET LENGTH IN MAIN SCANNING DIRECTION) − 2cm | (MEASUREMENT VALUE − IDEAL VALUE) / IDEAL VALUE |
| SUB SCANNING MAGNIFICATION (FRONT SURFACE) | $\dfrac{((a)-(c)-(g)) + ((a)-(e)-(i))}{2}$ | (SHEET LENGTH IN SUB SCANNING DIRECTION) − 2cm | (MEASUREMENT VALUE − IDEAL VALUE) / IDEAL VALUE |
| LEAD POSITION (BACK SURFACE) | $\dfrac{(k)+(m)}{2}$ | 1 cm | MEASUREMENT VALUE − IDEAL VALUE |
| SIDE POSITION (BACK SURFACE) | $\dfrac{(n)+(r)}{2}$ | 1 cm | MEASUREMENT VALUE − IDEAL VALUE |
| MAIN SCANNING MAGNIFICATION (BACK SURFACE) | $\dfrac{((b)-(l)-(n)) + ((b)-(p)-(r))}{2}$ | (SHEET LENGTH IN MAIN SCANNING DIRECTION) − 2cm | (MEASUREMENT VALUE − IDEAL VALUE) / IDEAL VALUE |
| SUB SCANNING MAGNIFICATION (BACK SURFACE) | $\dfrac{((a)-(k)-(o)) + ((a)-(m)-(q))}{2}$ | (SHEET LENGTH IN SUB SCANNING DIRECTION) − 2cm | (MEASUREMENT VALUE − IDEAL VALUE) / IDEAL VALUE |

FIG.10A

ADJUSTMENT OF PRINTING POSITION

SELECT ADJUSTMENT METHOD.

- AUTOMATIC ADJUSTMENT (READING BY PRESSING PLATE) — 1001
- AUTOMATIC ADJUSTMENT (READING BY ADF) — 1002
- MANUAL ADJUSTMENT — 1003

FIG.10B

ADJUSTMENT OF PRINTING POSITION

SELECT ADJUSTMENT METHOD.

- AUTOMATIC ADJUSTMENT (READING BY PRESSING PLATE) — 1001
- MANUAL ADJUSTMENT — 1003

READING OF ADJUSTMENT CHART

SET ADJUSTMENT CHART ON DOCUMENT POSITIONING PLATE OF PRESSING PLATE SO THAT FRONT SURFACE OF ADJUSTMENT CHART IS READ.

PRESS START READING BUTTON.

START READING — 1311

READING OF ADJUSTMENT CHART

SET ADJUSTMENT CHART ON DOCUMENT POSITIONING PLATE OF PRESSING PLATE SO THAT BACK SURFACE OF ADJUSTMENT CHART IS READ.

PRESS START READING BUTTON.

START READING — 1321

PRINTING APPARATUS, CONTROL METHOD FOR PRINTING APPARATUS, AND STORAGE MEDIUM FOR GENERATING AN IMAGE FORMING CONDITION BASED ON A READING RESULT

CROSS-REFERENCE TO RELATED APPLICATION

This application is a Divisional of U.S. application Ser. No. 15/392,182, filed Dec. 28, 2016; which is a Divisional of U.S. application Ser. No. 14/958,669, filed Dec. 3, 2015, now becomes U.S. Pat. No. 9,560,229, issued on Jan. 31, 2017; which claims priority from Japanese Patent Application No. 2014-249412, filed Dec. 9, 2014, which are hereby incorporated by reference herein in their entireties.

BACKGROUND OF THE INVENTION

Field of the Invention

The present invention relates to a printing apparatus for printing an image on a sheet, a control method for the printing apparatus, and a storage medium.

Description of the Related Art

There is an image forming apparatus that reads a chart with a black image having a predetermined width being printed thereon in advance by using an auto document feeder (ADF) to diagnose misregistration at a leading edge (see Japanese Patent Application Laid-Open No. 2005-176045).

To read a document by using an ADF, for example, a document placed on a document tray of the ADF is conveyed while an image of the document is read at a fixed position of an optical system. To read a document by using a document positioning plate, for example, a document placed on the platen glass (document positioning plate) is fixed while an optical system is moved to read an image of the document.

For example, when images of a plurality of documents are read, it is more desirable to use the ADF for reading them than to use the document positioning plate for reading them. The reason is that the plurality of documents can be placed on the document tray of the ADF and the documents can be separated and conveyed one by one. This can reduce time taken for a user repeatedly placing the documents.

An amount of shift of a printing position depends on physical properties of the sheet to print. Thus, for example, when a shift in the printing position with respect to a sheet of high grammage is checked, a black image having a predetermined width needs to be printed on the sheet of high grammage to output a chart. The chart of high grammage is more desirably read by using the document positioning plate than by using the ADF. The reason is that the chart of high grammage is difficult to bend, and when the chart is conveyed from the document tray of the ADF, the chart may fail to form a loop and can cause a jam on the way.

However, the image forming apparatus discussed in Japanese Patent Application Laid-Open No. 2005-176045 scans a chart by using the ADF to diagnose misregistration at the leading edge. As a result, with a technique discussed in Japanese Patent Application Laid-Open No. 2005-176045, a jam can occur when a specific chart is scanned (for example, chart of high grammage) by the ADF, and the amount of shift of the registration at the leading edge may fail to be obtained.

SUMMARY OF THE INVENTION

According to an aspect of the present invention, a printing apparatus includes, a printing unit configured to print an adjustment image for adjusting a printing position on a sheet, a conveying unit configured to convey the sheet on which the adjustment image is printed, a reading unit configured to read an image to generate image data, the reading unit being executable to perform reading by a first reading method for reading an image of a sheet without conveying the sheet and a second reading method for reading the image of the sheet while conveying the sheet, and a determining unit configured to determine, based on that a type of the sheet on which the adjustment image is printed is a specific type, to read the adjustment image by the first reading method.

Further features of the present invention will become apparent from the following description of exemplary embodiments with reference to the attached drawings.

BRIEF DESCRIPTION OF THE DRAWINGS

FIGS. 3A and 3B are examples of a sectional view illustrating a configuration of a scanner unit according to an exemplary embodiment of the present invention.

FIG. 4 is an example of a table according to an exemplary embodiment of the present invention.

FIGS. 5A and 5B are diagrams illustrating configurations of screens according to an exemplary embodiment of the present invention.

FIG. 7 is an example of a table according to an exemplary embodiment of the present invention.

FIGS. 10A and 10B are diagrams illustrating configurations of screens according to the first exemplary embodiment.

FIGS. 13A and 13B are diagrams illustrating configurations of screens according to the first exemplary embodiment.

DESCRIPTION OF THE EMBODIMENTS

Figure 1:
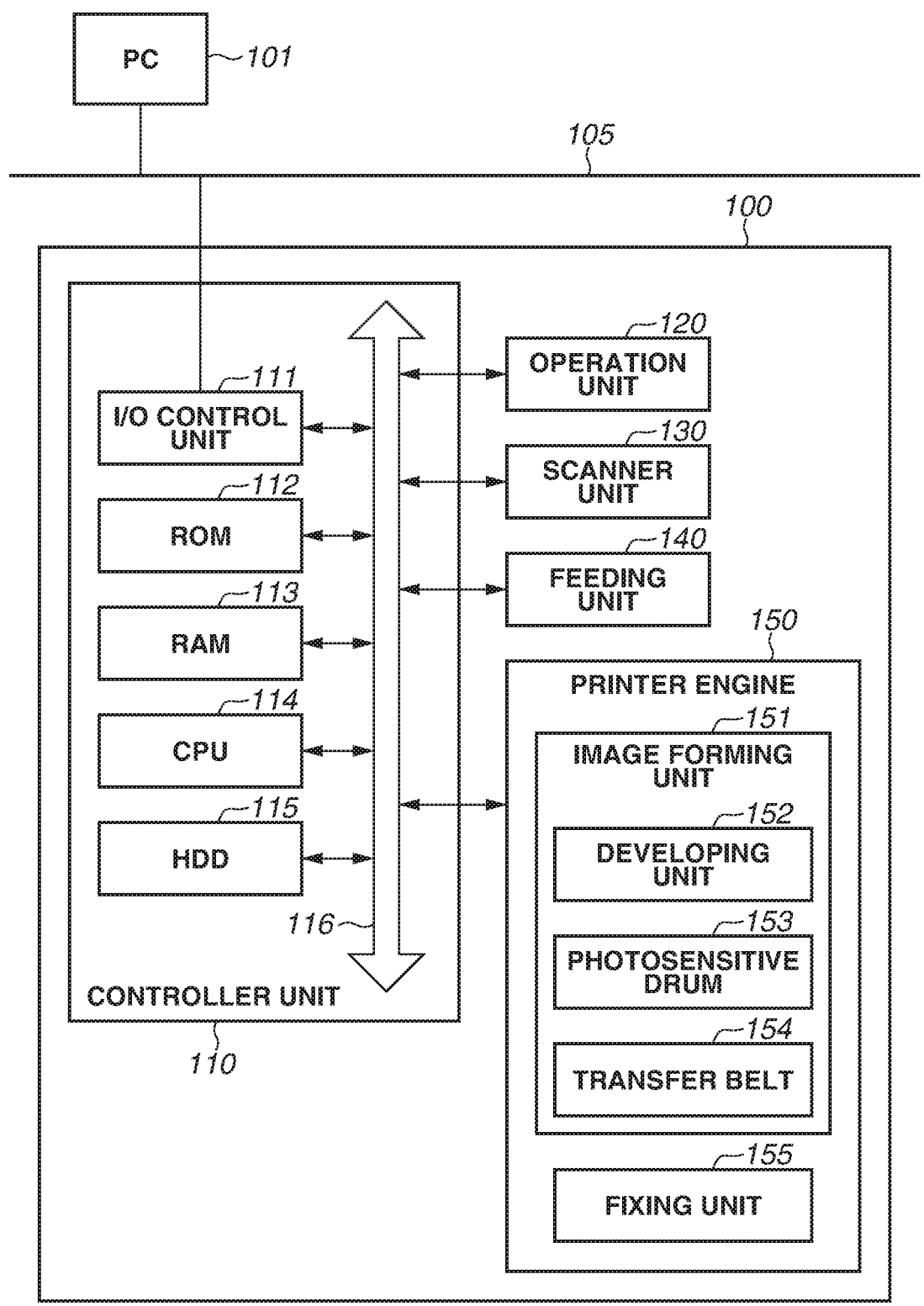
FIG. 1 is a block diagram illustrating a configuration of a printing system according to an exemplary embodiment of the present invention.

Exemplary embodiments of the present invention will be described in detail below with reference to the accompanying drawings. It should be noted that the following exemplary embodiments are not intended to limit the present invention set forth in the claims, and all combinations of the features described in the exemplary embodiments are not necessarily indispensable to the solving means of the present invention. Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, a Universal Serial Bus (USB) memory stick, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc. All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

A configuration of a printing system according to a first exemplary embodiment of the present invention will be described with reference to FIG. 1. In the following description of the first exemplary embodiment, scanning a document by an optical system moving method using a document positioning plate will be defined as "pressing plate reading". Scanning a document by a feed reading method using an ADF will be defined as "ADF reading".

In the first exemplary embodiment, a central processing unit (CPU) 114 instructs an image forming unit 151 to print an adjustment chart on a sheet for adjusting a shift at a printing position. Based on physical properties of the sheet, the CPU 114 then determines whether the printed adjustment chart can be scanned by ADF reading. If it is determined that the printed adjustment chart can be scanned by ADF reading, the CPU 114 controls a screen display so that the user can arbitrarily select either of "scanning by ADF reading" and "scanning by pressing plate reading" to perform automatic adjustment of the printing position. On the other hand, if it is determined that the printed adjustment chart cannot be scanned by ADF reading, the CPU 114 controls a screen display so that the user can arbitrarily select "scanning by pressing plate reading" to perform automatic adjustment of the printing position, but not "scanning by ADF reading". In the first exemplary embodiment, a method for adjusting the printing position is thus appropriately presented to the user based on the physical properties of the sheet on which the adjustment chart is printed.

A detailed description will be given below.

The printing system according to the present exemplary embodiment includes a printing apparatus 100 and a personal computer (PC) 101, which is an example of an external apparatus.

The printing apparatus 100 includes an image reading function for reading a document to generate image data, and a print function for printing an image on a sheet based on the generated image data (i.e., copy function). The printing apparatus 100 also includes a print function for receiving a print job from the PC 101 and printing characters and/or images on a sheet based on data for which a print instruction is received (PC print function). The print functions may implement either color or monochrome printing.

A controller unit (control unit) 110 of the printing apparatus 100 is connected to the PC 101 via a network cable 105. The controller unit 110 and the PC 101 are not limited to the configuration of being connected via the network cable 105. The controller unit 110 and the PC 101 may be connected via a local area network (LAN). The controller unit 110 and the PC 101 may be connected via a wide area network (WAN) such as the Internet, or via a dedicated printer cable. FIG. 1 illustrates an example of a configuration where one PC 101 is connected to the printing apparatus 100 via the network cable 105. However, it is not limited thereto. A plurality of PCs 101 may be connected to the printing apparatus 100 via the network cable 105.

For example, the PC 101 generates image data by using application software, and transmits the generated image data to the printing apparatus 100. The PC 101 also generates page description language (PDL) data, for example, by using application software and/or a printer driver. The controller unit 110 rasterizes the PDL data transmitted from the PC 101 via the network cable 105 to generate bitmap data. A program used for performing the rasterizing operation is stored in a read-only memory (ROM) 112 or a hard disk drive (HDD) 115 to be described below.

In the present exemplary embodiment, the PC 101 is described as an example of the external apparatus. However, it is not limited thereto. The external apparatus may be a portable information terminal such as a personal digital assistance (PDA) and a smartphone, a network-connected device, or an external dedicated apparatus.

Next, a block diagram of the printing apparatus 100 according to the present exemplary embodiment will be described with reference to FIG. 1. The printing apparatus 100 includes the controller unit 110, a printer engine 150, which is an image output device, the scanner unit 130, which is an image input device, a feeding unit 140, and an operation unit 120. Such units are electrically connected with each other, and transmit and receive control commands and data to/from each other.

The controller unit 110 collectively controls an operation of the printing apparatus 100, and performs input/output control of image information and device information. The controller unit 110 includes the CPU 114, an input/output (I/O) control unit 111, the ROM 112, a random access memory (RAM) 113, and the HDD 115 as a plurality of functional blocks. Such modules are connected to each other via a system bus 116.

The CPU 114 is a processor for controlling the entire printing apparatus 100. The CPU 114 collectively controls access with various connected devices based on a control program stored in the ROM 112. The CPU 114 also collectively controls various types of processing performed in the controller unit 110.

The I/O control unit 111 is a module for performing communication control with an external network.

The RAM 113 is a readable and writable memory. The RAM 113 also serves as a system work memory used for the CPU 114 operating. The RAM 113 stores image data input from the scanner unit 130 and the PC 101, various programs, and setting information.

The ROM 112 is a read-only memory. The ROM 112 is a boot ROM. A boot program of the printing system is stored in the ROM 112 in advance.

The HDD 115 mainly stores information (system software) required to activate and operate the computer, and image data.

If the controller unit 110 includes a nonvolatile RAM (NVRAM) (not illustrated), the system software, image data, and setting information received via the operation unit 120 to be described below may be stored in the NVRAM.

The RAM 113 or the HDD 115 stores a sheet management table 400 for managing attribute information about sheets to be used for printing by the printing apparatus 100 in a list form. Details of the sheet management table 400 will be described below with reference to FIG. 4.

The ROM 112 or the HDD 115 stores various control programs to be executed by the CPU 114, necessary to perform various types of processing of flowcharts to be described below. The ROM 112 or the HDD 115 also stores a display control program for causing a displaying unit (not illustrated) of the operation unit 120 including a user interface screen (hereinafter, UI screen) to display various UI screens. The CPU 114 reads the programs stored in the ROM 112 or the HDD 115 and loads the programs into the RAM 113 to perform various operations according to the present exemplary embodiment.

The printer engine 150 includes the image forming unit 151 and a fixing unit 155. Further, the image forming unit 151 includes a developing unit 152, a photosensitive drum 153, and a transfer belt 154. Details of the image forming unit 151 and the fixing unit 155 will be described below with reference to FIG. 2.

The scanner unit 130 scans an image of a document (sheet) by using an optical sensor to obtain scan image data. Details of the scanner unit 130 will be described below with reference to FIG. 3.

The feeding unit 140 is a unit for feeding sheets from a plurality of sheet holding units (such as a sheet feeding cassette, a sheet feeding deck, and a manual tray). Each sheet holding unit can hold a plurality of types of sheets and can hold a plurality of sheets. The sheets held in the sheet holding unit are separated one by one from the top and conveyed to the image forming unit 151. The image forming unit 151 prints an image on the sheet fed from the sheet holding unit based on image data input from the scanner unit 130 or the PC 101.

The operation unit 120 corresponds to an example of a user interface unit. The operation unit 120 includes the displaying unit (not illustrated) and a key input unit (not illustrated). The operation unit 120 has a function for receiving various settings from the user via the displaying unit and the key input unit. The operation unit 120 also has a function for providing information to the user via the displaying unit.

The displaying unit includes a liquid crystal display (LCD) displaying unit and a touch panel sheet including transparent electrodes (may be of electrostatic capacity type) attached onto the LCD. The LCD displays an operation screen as well as a state of the printing apparatus 100. The key input unit includes, for example, a start key used to instruct execution of scanning start or copying start, and a stop key used to instruct an operation stop of scanning or copying in operation.

Next, an example of a sectional view illustrating a configuration of the image forming unit 151 will be described with reference to FIG. 2.

The image forming unit 151 forms a toner image on the periphery of the photosensitive drum 153 by using the developing unit 152 according to image data generated by the controller unit 110.

The developing unit 152 is arranged to oppose the photosensitive drum 153. The inside of the developing unit 152 is divided into a developing portion 202 and an agitation portion 203 by a partition wall 201 extending in a vertical direction.

A nonmagnetic developing sleeve 204 rotating in the direction of the arrow 241 is arranged in the developing portion 202. A magnet 205 is fixedly arranged inside the developing sleeve 204.

The developing sleeve 204 conveys a developer (e.g., two-component developer, including magnetic carrier and nonmagnetic toner) taken out by a blade 206. The developing sleeve 204 supplies the developer to the photosensitive drum 153 in a developing area opposing the photosensitive drum 153, whereby an electrostatic latent image on the photosensitive drum 153 is developed. To improve the developing efficiency, i.e., the rate of attachment of the toner to the electrostatic latent image, a developing bias voltage obtained by superposing an alternating-current voltage on a direct-current voltage is applied to the developing sleeve 204.

Screws 207 and 208 for agitating the developer are arranged in the developing portion 202 and the agitation portion 203, respectively. The screw 207 agitates the developer in the developing portion 202 and conveys the agitated developer. The screw 208 agitates toner 213 supplied from a toner discharge port 211 of a toner replenishment tank 210 by rotation of a conveyance screw 212, and a developer 214 already existing in the developing unit 152. The screw 208 also conveys the agitated developer to uniformize toner density.

Figure 2:
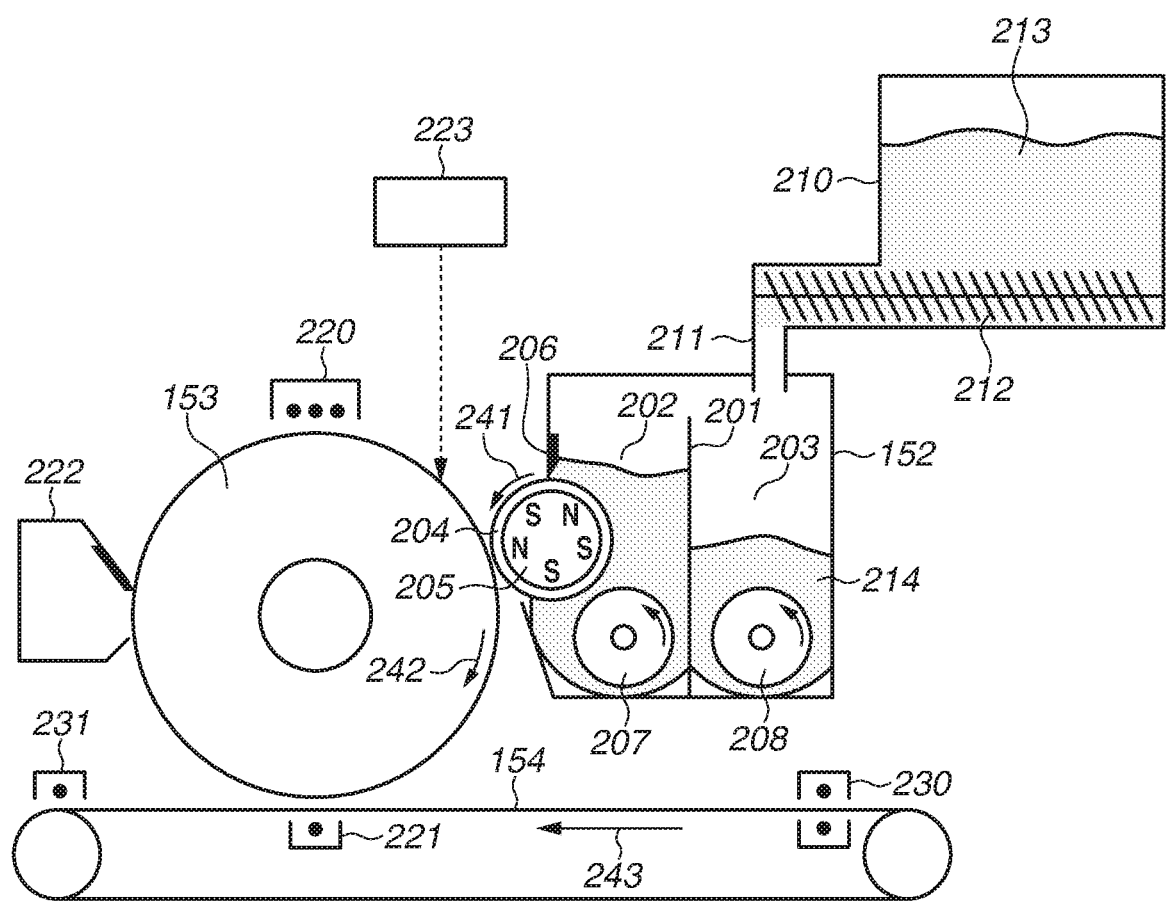
FIG. 2 is an example of a sectional view illustrating a configuration of an image forming apparatus according to an exemplary embodiment of the present invention.

The partition wall 201 has developer passages (not illustrated) for communicating the developing portion 202 and the agitation portion 203 with each other at near and far ends in FIG. 2. The developer, of which the toner density has dropped due to toner consumption by the developing, in the developing portion 202 is moved into the agitation portion 203 through one of the developer passages by conveyance force of the screws 207 and 208. The developer of which the toner density is restored in the agitation portion 203 is moved into the developing portion 202 through the other developer passage.

The photosensitive drum 153 is driven to rotate in the direction of the arrow 242. A primary charging unit 220, the developing unit 152, a transfer unit 221, and a drum cleaner 222 are arranged around the photosensitive drum 153 in this order in the rotation direction of the photosensitive drum 153. The primary charging unit 220 uniformly charges the photosensitive drum 153. The transfer unit 221 is intended to transfer a developed visible toner image to a sheet.

An image exposure device 223 is arranged above the photosensitive drum 153. The image exposure device 223 includes a semiconductor laser, a polygon mirror, and a reflection mirror. The image exposure device 223 receives input of a digital pixel signal (video data) corresponding to an image converted into a digital signal by the controller unit 110, and emits a laser beam modulated according to the digital pixel signal.

The image exposure device 223 irradiates the photosensitive drum 153 with the laser beam to scan the photosensitive drum 153 in its generatrix direction between the primary charging unit 220 and the developing unit 152. A drum surface of the photosensitive drum 153 is thereby exposed to form an electrostatic latent image. The photosensitive drum 153 then rotates and the electrostatic latent image is developed into a visible toner image by the developing unit 152.

The transfer belt 154 for conveying a sheet in the direction of the arrow 243 is arranged under the photosensitive drum 153. The transfer belt 154 is stretched around a plurality of rollers.

A sheet fed from the feeding unit 140 is conveyed from the right side of the transfer belt 154. The sheet is then borne on the transfer belt 154 by the action of attraction charging units 230 arranged opposing each other across the transfer belt 154, and conveyed to the left side of the transfer belt 154 (in the direction of the arrow 243). When the sheet passes between the photosensitive drum 153 and the transfer unit 221, the visible toner image developed on the photosensitive drum 153 is transferred to the sheet by the action of the transfer unit 221. The sheet to which the toner image is transferred is separated from the transfer belt 154 by a discharging charging unit 231, and conveyed to the fixing unit 155.

The sheet then passes between a pressure roller (not illustrated) and a heating roller (not illustrated) of the fixing unit 155, whereby the toner is melted and pressed. As a result, the toner image is fixed to the sheet. After the transfer of the toner to the sheet, toner remaining on the photosensitive drum 153 is removed by the drum cleaner 222.

Next, an example of sectional views illustrating a configuration of the scanner unit 130 will be described with reference to FIGS. 3A and 3B.

There are two methods for reading an image of a document 301, namely, a feed reading method and an optical system moving method. In the feed reading method, the document 301 is placed on a document stacking unit (also referred to as a document tray) 340. The document 301 is conveyed by an ADF while the image of the document 301 is read at a fixed position of an optical system. In the optical system moving method, the document 301 is placed on a platen glass (document positioning plate) 302. The optical system is moved while reading the image of the document 301 at a fixed document position.

The scanner unit 130 according to the present exemplary embodiment will be described assuming a case where both a configuration for scanning the document 301 by using the ADF and a configuration for scanning the document 301 by using the document positioning plate are included therein. However, the present exemplary embodiment is not limited thereto. In the first exemplary embodiment, the scanner unit 130 may only be required to include at least either one of the configuration for scanning the document 301 by using the ADF and the configuration for scanning the document 301 by using the platen glass 302.

An instruction to start a read operation (also referred to as a scan operation) of the image on the document 301 by the scanner unit 130 is given, for example, by the user pressing the start key for instructing a scanning start. Alternatively, an instruction to start the scan operation may be given, for example, by the user pressing a start button displayed on the displaying unit of the operation unit 120.

The case of reading the image on the document 301 by using the document positioning plate will initially be described with reference to FIG. 3A.

If an instruction to start the scan operation is given, to read the image on the document 301 placed on the platen glass 302, a motor 312 is driven to once return a first mirror unit 303 and a second mirror unit 304 to a position where a home position sensor 305 is disposed. A document illumination lamp 306 is turned on to irradiate the document 301 with the light. Reflected light from the document 301 is transmitted via a first mirror 307 in the first mirror unit 303, a second mirror 308 in the second mirror unit 304, and a third mirror 309 in the second mirror unit 304. The reflected light from the third mirror 309 is transmitted through a lens 310 to form an image on a charge coupled device (CCD) sensor 311, and input to the CCD sensor 311 as a light signal.

The second mirror unit 304 moves at a half speed of the speed (V) of the first mirror unit 303, i.e., V/2. The entire surface of the document 301 is scanned in such a manner.

In the present exemplary embodiment, the scanner unit 130 is described to include a reduction optical system with which the reflected light from the document 301 forms an image on the CCD sensor 311. However, it is not limited thereto. The scanner unit 130 may include an equal magnification optical system with which the reflected light from the document 301 forms an image on a contact image sensor (CIS).

Next, the case of reading the image on the document 301 by using the ADF will be described with reference to FIG. 3B.

If a document (not illustrated) is detected to be set on the document stacking unit 340 by a document detection sensor (not illustrated) arranged between a pickup roller 322 and a feed roller 323, the scan operation of the document by using the ADF is started.

If an instruction to start the scan operation is received, then, a document feeding unit 341 separates the topmost sheet (document) of the document bundle by a friction separation method one by one, and conveys the separated document to a registration roller pair 324. To feed the document, the pickup roller 322 moves down on the document bundle and a lifting plate moves up to press the document bundle against the feed roller 323 to enter a preliminary operation for document feeding. With a motor (not illustrated) as a driving source, the feed roller 323 and the pickup roller 322 then rotate clockwise to convey the document. The second and subsequent sheets to be conveyed subsequent to the topmost sheet are stopped by a friction piece (not illustrated) and remain on the document stacking unit 340. The separation of the document is detected by a separation sensor (not illustrated) arranged downstream from the feed roller 323.

The separated document then passes between guide plates (not illustrated) and conveyed to the registration roller pair 324. When the leading edge of the document reaches the registration roller pair 324, the registration roller pair 324 is stopped. The conveyance by the feed roller 323 loops the document to correct skew, and the document is conveyed to a document conveyance unit 342.

The document conveyance unit 342 rotates a conveyance belt 325, which is stretched around a driving roller 326 and a driven roller 327. The conveyance belt 325 is pressed against the platen glass 302 by pressure rolls 328. The document conveyed to between the conveyance belt 325 and the platen glass 302 passes over the platen glass 302 by frictional force of the conveyance belt 325.

The document conveyed from the document feeding unit 341 to the document conveyance unit 342 is conveyed to a predetermined position of the platen glass 302 by the conveyance belt 325. Then, the driving motor (not illustrated) is stopped to stop conveyance. The scanner unit 130 then reads the image of the document by moving the first and second mirror units 303 and 304 illustrated in FIG. 3A.

After the reading by the scanner unit 130 ends, the document is conveyed to a reversing discharge unit 343 by the conveyance belt 325. At that time, a reversing flapper 331 for regulating the traveling path of the sheet near an inlet of the reversing discharge unit 343 is controlled by a solenoid (not illustrated) to convey the document to a reversing roller 329. The document is then nipped between the reversing roller 329 rotating counterclockwise and a reversing roller 332 opposing the reversing roller 329, and conveyed to a conveyance roller pair 330.

When the trailing edge of the document reaches a point after passing through a discharge flapper 333, the discharge flapper 333 turns clockwise and the reversing roller 329 makes reverse rotation, i.e., clockwise. This starts switchback conveyance of the document. In this way, the document conveyed by the clockwise rotation of the reversing roller 329 is discharged to a document discharge unit 344. When there is a subsequent document, the subsequent document is conveyed to the predetermined position by the rotation of the conveyance belt 325 like the preceding document. The image of the document stopped at the reading position according to the stop of the driving motor is then read by the scanner unit 130 by moving the first and second mirror units 303 and 304 illustrated in FIG. 3A. During the execution of such a scan operation, the preceding document is reversed by the reversing discharge unit 343, which operates independently, and conveyed to the document discharge unit 344.

In the example illustrated in FIG. 3B, a method is described in which the document 301 is conveyed to the position at which the document 301 is read by using the document positioning plate, and the conveyance of the document 301 is stopped for scanning (optical system moving method), when the image of the document 301 is read by using the ADF. However, it is not limited thereto. For example, the method for reading the image of the document 301 by using the ADF may include conveying the document 301 at constant speed while scanning the document 301 by the scanner unit 130, with the first and second mirror units 303 and 304 fixed at a position without moving them (feed reading method).

To scan the back surface of the document 301 by using the ADF, after the front surface of the document 301 is scanned, the document 301 may be reversed and conveyed to successively scan the back surface of the document 301 (referred to as two-sided reversing reading). Alternatively, if the scanner unit 130 includes two reading sensors above and below the conveyance path of the document 301, the front and back surfaces of the document 301 may be simultaneously scanned by feed reading (referred to as two-sided simultaneous reading).

In the following description of the present exemplary embodiment, scanning the document 301 by the "optical system moving method using the document positioning plate" will be defined as "pressing plate reading". Scanning the document 301 by the "feed reading method using the ADF" will be defined as "ADF reading".

Next, details of the sheet management table 400 for managing the attribute information about the sheets used for printing in the printing apparatus 100 will be described with reference to FIG. 4.

Examples of the sheets used for printing in the printing apparatus 100 include sheets to be used normally, sheets evaluated by printer makers, and user-defined sheets, which are standard sheets or evaluated sheets of which attribute information is customized by the user. The attribute information about such the plurality of sheets is stored in the RAM 113 or the HDD 115 in a list form using the sheet management table 400. The pieces of data registered in the sheet management table 400 are digital information such as of Extensible Markup Language (XML) and comma-separated values (CSV). Software modules can read and write the sheet management table 400 stored in the RAM 113 or the HDD 115.

Next, details of the data registered in the sheet management table 400 (attribute information about sheets) will be described below.

A sheet name 411 is information for identifying the sheets used for printing from each other.

A sheet length in a sub scanning direction 412, a sheet length in a main scanning direction 413, grammage of a sheet 414, and a surface property of the sheet 415 are physical properties of the sheet used for printing. The surface property of the sheet 415 is an attribute for indicating a physical property of the surface of the sheet. Examples include "coated" which indicates the application of surface coating for improved glossiness, and "embossed" which indicates the presence of surface projections and depressions.

Color of a sheet 416 is an attribute for indicating the background color of the sheet. Preprinted paper 417 is information for identifying whether the sheet used for printing is preprinted paper.

The printing apparatus 100 adjusts a shift in the printing position with respect to a sheet at the time of execution of printing so that an image is printed at an ideal printing position. The amount of shift in the printing position with respect to the front surface of a sheet 420 is information indicating the amount of positional shift from an ideal printing position on the front surface of the sheet. The amount of shift in the printing position with respect to the back surface of a sheet 421 is information indicating the amount of positional shift from an ideal printing position on the back surface of the sheet.

Examples of the amounts of shift in the printing position 420 and 421 include the amount of shift in the printing position in the sub scanning direction (hereinafter, referred to as the amount of shift in a lead position) with respect to the sheet. The lead position refers to the start position of printing an image, with the leading edge of the adjustment chart in the conveyance direction of the sheet as the origin. An initial value of the lead position is zero. When the amount of shift in the lead position is adjusted, the radiation start timing of the laser beam from the image exposure device 223 onto the photosensitive drum 153 is adjusted. As a result, the start position of printing the image with respect to the leading edge of the adjustment chart in the conveyance direction of the sheet can be changed.

Examples of the amounts of shift in the printing position 420 and 421 include the amount of shift in the printing position in the main scanning direction (hereinafter, referred to as the amount of shift in a side position) with respect to the sheet. The side position refers to the start position of printing an image, with the left edge of the adjustment chart in the conveyance direction of the sheet as the origin. An initial value of the side position is zero. When the amount of shift in the side position is adjusted, the radiation start timing of the laser light from the image exposure device 223 onto the photosensitive drum 153 is adjusted. As a result, the start position of printing the image with respect to the left edge of the adjustment chart in the conveyance direction of the sheet can be changed.

Examples of the amounts of shift in the printing position 420 and 421 include the amount of shift in an image length (magnification to an ideal length) in the sub scanning direction (hereinafter, referred to as sub scanning magnification) and the amount of shift in an image length (magnification to an ideal length) in the main scanning direction (hereinafter, referred to as main scanning magnification). Initial values of the sub scanning magnification and the main scanning magnification are zero. The sub scanning magnification is adjusted by controlling a driving speed of the transfer belt 154. On the other hand, the main scanning magnification is adjusted by controlling a clock frequency of the laser beam when the image exposure device 223 modulates the digital image signal into the laser beam.

The amounts of shift in the printing position 420 and 421 are calculated by the scanner unit 130 scanning an adjustment chart on which predetermined marks are printed, and detecting the positions of the marks on the adjustment chart. Details of the adjustment chart on which the predetermined marks are printed will be described below with reference to FIG. 6.

As described above, it is described that the amounts of shift in the printing position 420 and 421 are adjusted, for example, by adjusting the radiation timing of the laser beam. However, it is not limited thereto. A shift in the printing position may be adjusted by shifting the image to be printed on the sheet itself by a predetermined amount during printing. When the amounts of shift in the printing position are adjusted, the user may be allowed to arbitrarily designate the amounts of shift of the image to be printed on the sheet.

The user can edit the attribute information about the sheets registered in the sheet management table 400 and additionally register a new sheet into the sheet management table 400 by using an editing screen 500 illustrated in FIG. 5A. For example, the editing screen 500 is displayed on the displaying unit of the operation unit 120 or a monitor (not illustrated) of the PC 101.

A sheet selected by the user via the editing screen 500 is highlighted. In the example illustrated in FIG. 5A, the sheet "XYZ paper co., color 81" is highlighted. The user can press a button 501 on the editing screen 500 to add a new sheet to be registered in the sheet management table 400. The user can press a button 502 on the editing screen 500 to edit the attribute information about the selected sheet (highlighted sheet). If the button 501 or 502 is pressed by the user, an editing screen 510 illustrated in FIG. 5B is called. For example, the editing screen 510 is displayed on the displaying unit of the operation unit 120 or the monitor (not illustrated) of the PC 101.

On the editing screen 510, the user can input respective pieces of data about, for example, the sheet name, sheet length in the sub scanning direction, sheet length in the main scanning direction, grammage, surface property, color, and preprinted paper. The surface property is selected from a list of surface properties that can be supported by the printing apparatus 100. The color is selected from a list of colors registered in advance. If the user inputs the pieces of data and then presses a button 511 on the editing screen 510, the data (attribute information about the sheet) input at that time is finalized and registered in the sheet management table 400.

On the editing screen 510, the user can input attribute information about the sheet name, sheet length in the sub scanning direction, sheet length in the main scanning direction, grammage, surface property, and color. For the surface property, the user selects one from the list of surface properties that can be supported by the printing apparatus 100. For the color, the user can select arbitrary one from the list of colors registered in advance. On the editing screen 510, the user can input information about whether the sheet to be edited is preprinted paper.

If the user presses an end editing button 511 on the editing screen 510, the sheet attributes input at that time are finalized and registered in the sheet management table 400.

The user can press a button 503 on the editing screen 500 to perform a series of processing for adjusting the printing position with respect to the selected sheet (highlighted sheet). Details of the series of processing for adjusting the printing position will be described below with reference to FIGS. 8 to 10.

Next, an example of a schematic diagram illustrating an adjustment chart used to adjust the printing position will be described with reference to FIG. 6.

Image data for an adjustment chart 601 is stored in the RAM 113 or the HDD 115. When printing the adjustment chart 601, the image data on the adjustment chart 601 is read from the RAM 113 or HDD 115 and transferred to the printer engine 150.

When the printing position on the front surface is adjusted with respect to a sheet, the marks 620 are printed at specific positions (for example, on four corners) of the front surface of the sheet. When the printing position on the back is adjusted with respect to the sheet, the marks 620 are printed at specific positions (e.g., on four corners) of the back surface of the sheet. The marks 620 are formed by using toner of a color that has a large difference in reflectance with respect to a normal sheet (e.g., black toner). In this way, four marks 620 are printed on the front surface and four on the back surface of the adjustment chart 601 (i.e., a total of eight marks 620).

An image 610 for identifying the conveyance direction of the adjustment chart 601 and an image 612 for identifying the front or back surface of the adjustment chart 601 are printed on the front surface of the adjustment chart 601. An image 611 for identifying the conveyance direction of the adjustment chart 601 and an image 613 for identifying the front or back surface of the adjustment chart 601 are printed on the back surface of the adjustment chart 601.

In other words, to position two-sided images when two-sided printing is performed, the images 610 and 612 are printed on the front surface of the adjustment chart 601, and the images 611 and 613 are printed on the back surface of the adjustment chart 601. On the other hand, to adjust the printing position when one-sided printing is performed, at least the images 610 and 612 are printed on the front surface of the adjustment chart 601.

The images 610 and 611 for identifying the conveyance direction of the adjustment chart 601 have only to be printed when the adjustment chart 601 is scanned by ADF reading. When the adjustment chart 601 is scanned by pressing plate reading, the images 610 and 611 do not need to be printed.

Figure 6:
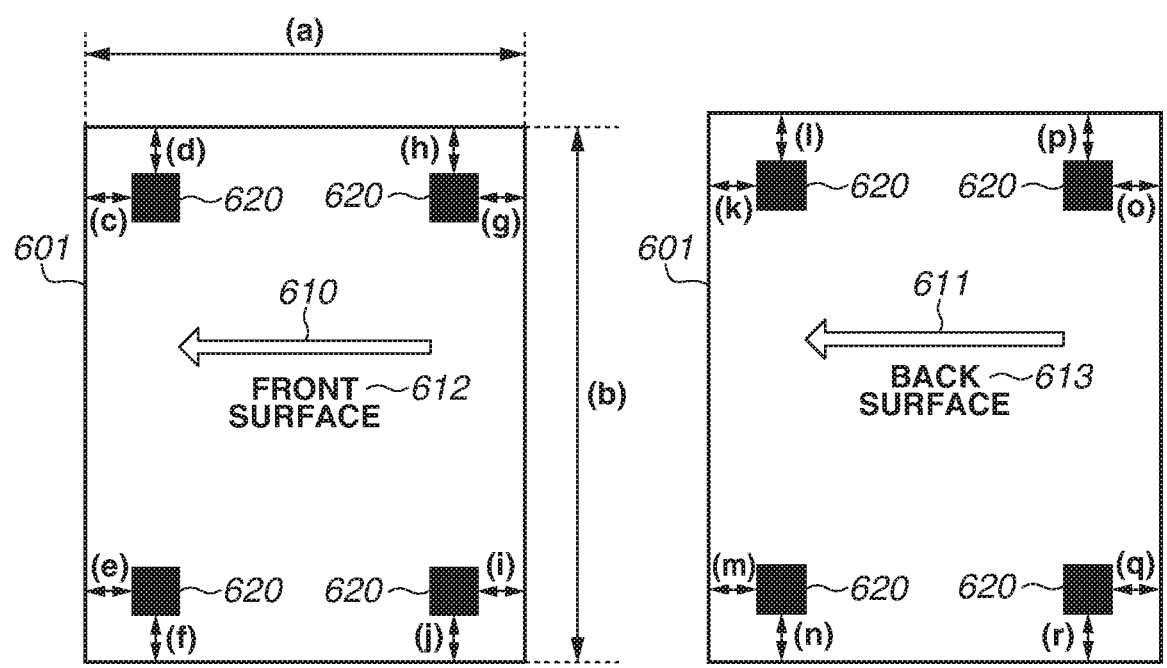
FIG. 6 is an example of a schematic diagram illustrating an adjustment chart according to an exemplary embodiment of the present invention.

As illustrated in FIG. 6, examples of the images 610 and 611 are arrows with which the user can identify the conveyance direction of the adjustment chart 601. On the other hand, examples of the images 612 and 613 are characters with which the user can identify the front and back surfaces of the adjustment chart 601.

The marks 620, if printed at ideal positions, are arranged to be printed at positions with predetermined distances from the edges of the adjustment chart 601. The positions of the marks 620 printed on the front surface of the adjustment chart 601 are measured to calculate (or obtain) the amount of shift in the printing position on the front surface of the sheet.

The position of the marks 620 printed on the back surface of the adjustment chart 601 is measured to calculate (or obtain) the amount of shift in the printing position on the back surface of the sheet.

Relative positions between the respective marks 620 printed on the front and back surfaces of the adjustment chart 601 may be measured to calculate (or obtain) the amounts of shifts in the printing position on the back surface with respect to the printing position on the front surface, or the amounts of shifts in the printing position on the front surface with respect to the printing position on the back surface.

Next, a case of adjusting the printing position by using the adjustment chart 601 will be described below with reference to FIG. 6.

To measure the positions of the marks 620 on the front and back surfaces of the adjustment chart 601, portions (a) to (j) on the front surface of the adjustment chart 601 and portions (k) to (r) on the back surface of the adjustment chart 601 are measured, respectively.

The portion (a) is the length of the adjustment chart 601 in the sub scanning direction. The portion (b) is the length of the adjustment chart 601 in the main scanning direction. The ideal length of the portion (a) is the sheet length in the sub scanning direction 412 registered in the sheet management table 400. The ideal length of the portion (b) is the sheet length in the main scanning direction 413 registered in the sheet management table 400. The lengths of the portions (c) to (r) are the distances from the respective marks 620 to the closest edges of the adjustment chart 601.

The lengths of the portions (a) to (r) may be measured by a manual measurement method or an automatic calculation method. In the manual measurement method, the user actually measures the lengths of the portions (a) to (r) of the adjustment chart 601 by using a ruler.

On the other hand, in the automatic calculation method, the scanner unit 130 scans the adjustment chart 601. Then, the CPU 114 analyzes the image data generated by reading the images of the adjustment chart 601. As a result of the analysis, the CPU 114 detects the edges of the adjustment chart 601 and the edges of the marks 620 (i.e., the borders between the background of the adjustment chart 601 and the marks 620) based on a difference in density. Then, the CPU 114 calculates the lengths of the portions (a) to (r) from the detected edges of the adjustment chart 601 and the edges of the marks 620. Details of the processing for analyzing the image data on the adjustment chart 601 will be described below with reference to FIG. 8.

Next, a method for calculating the amounts of shift in the printing position based on the measured positions of the marks 620 will be described with reference to FIG. 7.

FIG. 7 illustrates a table 700 which defines measurement value 710, ideal value 711, and the amount of shift in the printing position 712 of the "lead position", "side position", "main scanning magnification", and "sub scanning magnification" on the front and back surfaces of the adjustment chart 601. The table 700 is stored in the RAM 113 or the HDD 115.

For example, the measurement value 710 of the "lead position" on the front surface of the adjustment chart 601 is calculated from the actually measured values of the portions (c) and (e) illustrated in FIG. 6 by using the formula illustrated in the table 700. More specifically, the lead position is an average of the distances from the leading edge of the adjustment chart 601 in the conveyance direction of the sheet to the respective corresponding marks 620.

For example, the measurement value 710 of the "side position" on the front surface of the adjustment chart 601 is calculated from the actually measured values of the portions (f) and (j) illustrated in FIG. 6 by using the formula illustrated in the table 700. More specifically, the side position is an average of the distances from the left edge of the adjustment chart 601 in the conveyance direction of the sheet to the respective corresponding marks 620.

For example, the measurement value 710 of the "main scanning magnification" on the front surface of the adjustment chart 601 is calculated from the actually measured values of the portions (b), (d), (f), (h), and (j) illustrated in FIG. 6 by using the formula illustrated in the table 700. More specifically, the main scanning magnification is an average of the distances between the marks 620 arranged on the same scanning lines in the main scanning direction.

For example, the measurement value 710 of the "sub scanning magnification" on the front surface of the adjustment chart 601 is calculated from the actually measured values of the portions (a), (c), (e), (g), and (i) illustrated in FIG. 6 by using the formula illustrated in the table 700. More specifically, the sub scanning magnification is an average of the distances between the marks 620 arranged on the same scanning lines in the sub scanning direction.

As illustrated in the table 700, the ideal values 711 of the "lead position" and the "side position" are both 1 cm. In other words, the marks 620 can ideally be printed at positions 1 cm from the respective corresponding edges of the adjustment chart 601.

As illustrated in the table 700, the ideal value 711 of the "main scanning magnification" is a value obtained by subtracting 2 cm from the sheet length in the main scanning direction of each sheet registered in the sheet management table 400. Similarly, the ideal value 711 of the "sub scanning magnification" is a value obtained by subtracting 2 cm from the sheet length in the sub scanning direction of each sheet registered in the sheet management table 400.

As illustrated in the table 700, the amounts of shift in the printing position 712 in terms of the "lead position", "side position", "main scanning magnification", and "sub scanning magnification" are calculated by using the respective corresponding measurement values 710 and ideal values 711.

More specifically, the amounts of shift in the printing position 712 of the "lead position" and the "side position" are calculated by subtracting the ideal values 711 from the measurement values 710 (in units of "mm"). The amounts of shift in the printing position 712 of the "main scanning magnification" and the "sub scanning magnification" are calculated by subtracting the ideal values 711 from the measurement values 710, divided by the ideal values 711 (in units of "%").

The amounts of shift in the printing position 712 calculated above are registered in the sheet management table 400 as the attribute information about the sheet.

Next, a method for detecting image edges of the adjustment chart 601 and image edges of the marks 620 based on image data 800 generated by scanning the adjustment chart 601 by the scanner unit 130 will be described with reference to FIGS. 8A and 8B.

Figure 8A:
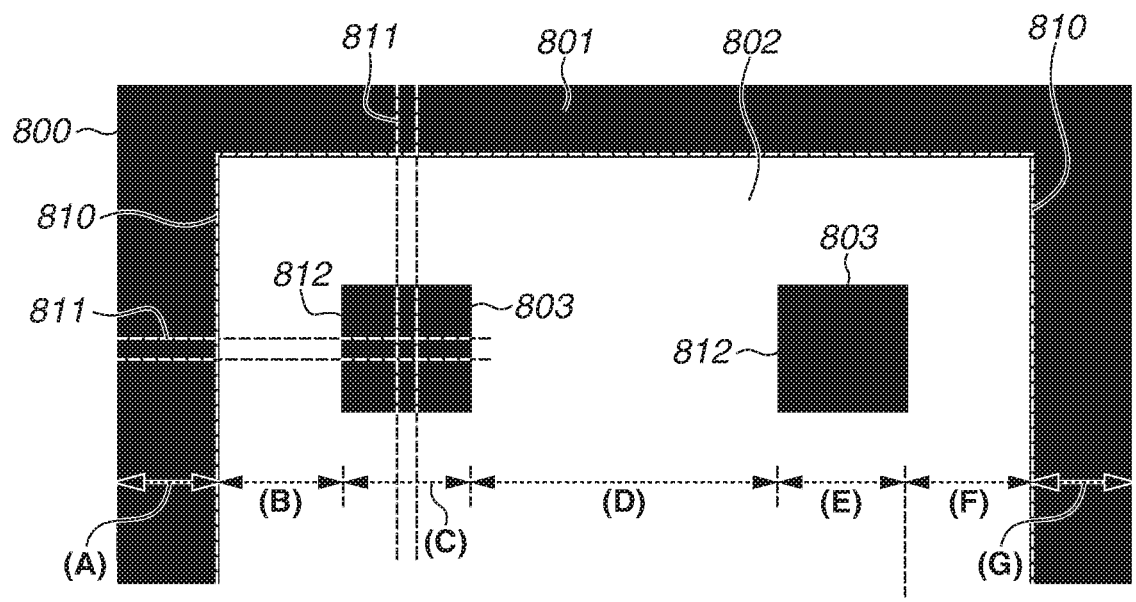
FIGS. 8A and 8B are diagrams illustrating detection processing according to an exemplary embodiment of the present invention.
Figure 8B:
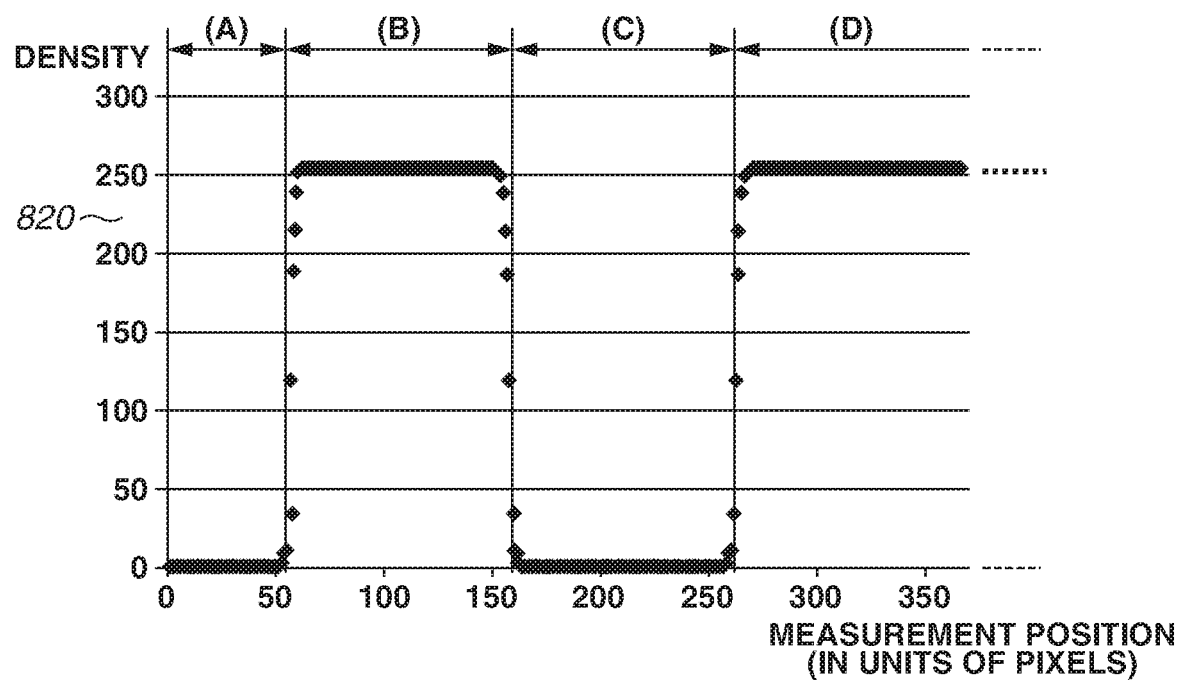

In the example illustrated in FIGS. 8A and 8B, the adjustment chart 601 is assumed to be scanned by pressing plate reading, with a backing sheet (not illustrated) of a black image put over the adjustment chart 601 that is placed on the platen grass 302. To scan the adjustment chart 601 by ADF reading, an adjustment chart (not illustrated) obtained by forming black marks in contact with part of the edges of the adjustment chart 601 may be scanned instead of the scanning with the backing sheet. In such a case, the same description applies.

Part of the image data 800 generated by scanning the adjustment chart 601 by pressing plate reading will be described with reference to FIG. 8A.

An area 801 is an image data area of the image data 800 based on the backing sheet (not illustrated). An area 802 is an image data area of the image data 800 based on the background of the adjustment chart 601. Areas 803 are image data areas of the image data 800 based on the marks 620 of the adjustment chart 601. Edges 810 are the edges of the area 802 (i.e., the image edges of the adjustment chart 601). Edges 812 are the edges of the areas 803 (i.e., the image edges of the marks 620).

Analysis ranges 811 are ranges where the image data 800 is analyzed therein (in other words, ranges of interest of analysis processing). The image data 800 is analyzed by measuring changes in density in the main scanning direction and the sub scanning direction from the image edges of the image data 800 in units of pixels. The CPU 114 then detects the areas 801, 802, and 803, and the edges 810 and 812 from the measurement result. The units of measurement may be smaller than or greater than pixels. The reading may be performed at regular pitches or in a thinned manner.

Next, an example of an analysis result of the image data 800 in an analysis range 811 will be described with reference to FIG. 8. The measurement of the density of the image data 800 in the analysis range 811 starts at an image edge of the image data 800.

First, the CPU 114 detects the density of the area 801 (corresponding to a section (A) in FIGS. 8A and 8B). Then, the CPU 114 detects the density of the area 802 lying between the areas 801 and 803 (corresponding to a section (B) in FIGS. 8A and 8B). Then, the CPU 114 detects the density of the area 803 lying between the areas 802 and 812 (corresponding to a section (C) in FIGS. 8A and 8B). Then, the CPU 114 detects the density of the area 802 lying between the areas 803 (corresponding to a section (D) in FIGS. 8A and 8B). Then, the CPU 114 detects the density of the area 803 lying between the areas 802 (corresponding to a section (E) in FIGS. 8A and 8B). Then, the CPU 114 detects the density of the area 802 lying between the areas 803 and 801 (corresponding to a section (F) in FIGS. 8A and 8B). Then, the CPU 114 detects the density of the area 801 (corresponding to a section (G) in FIGS. 8A and 8B).

Based on these measurement results, the CPU 114 calculates the ranges of the images printed on the adjustment chart 601 from the measured positions of the sections (A) to (G) of the image data 800. The CPU 114 further detects that the areas 803 in the sections (C) and (E) are based on the density of the marks 620 printed on the printing apparatus 601. The CPU 114 further detects that the areas 801 in the sections (A) and (G) are based on the density of the background of the backing sheet (not illustrated).

From such a detection result, the CPU 114 detects a point where the density switches between the sections (A) and (B) as an edge 810 (i.e., image edge (left edge) of the adjustment chart 601). The CPU 114 further detects a point where the density switches between the sections (B) and (C) as an edge 812 (i.e., image edge (left edge) of the left mark 620). The CPU 114 further detects a point where the density switches between the sections (C) and (D) as an edge 812 (i.e., image edge (right edge) of the left mark 620). The CPU 114 further detects a point where the density switches between the sections (D) and (E) as an edge 812 (i.e., image edge (left edge) of the right mark 620). The CPU 114 further detects a point where the density switches between the sections (E) and (F) as an edge 812 (i.e., image edge (right edge) of the right mark 620). The CPU 114 further detects a point where the density switches between the sections (F) and (G) as an edge 810 (i.e., image edge (right edge) of the adjustment chart 601).

Based on the above-described detection result, the CPU 114 then calculates the distance from the image edge (left edge) of the adjustment chart 601 to the image edge (left edge) of the left mark 620 as the length of the portion (c) of the adjustment chart 601.

The CPU 114 further calculates the distance from the image edge (right edge) of the right mark 620 to the image edge (right edge) of the adjustment chart 601 as the length of the portion (g) of the adjustment chart 601.

The CPU 114 further calculates the distance from the image edge (left edge) of the adjustment chart 601 to the image edge (right edge) of the adjustment chart 601 as the length of the portion (a) of the adjustment chart 601.

While the method of calculating the lengths of the portions (c) and (g) of the adjustment chart 601 is described above, the lengths of the portions (e) and (i), (d) and (f), and (h) and (j) of the adjustment chart 601 can also be calculated by a similar way. While the method for calculating the length of the portion (a) of the adjustment chart 601 is described above, the length of the portion (b) of the adjustment chart 601 can also be calculated by a similar way.

In this way, since the image edges of the adjustment chart 601 and the image edges of the marks 620 are detected, the CPU 114 can automatically calculate the lengths of the portions (a) to (r) of the adjustment chart 601.

In the first exemplary embodiment, the CPU 114 instructs the image forming unit 151 to print the adjustment chart 601 on a sheet used for adjusting a shift in the printing position. Then, the CPU 114 determines whether the printed adjustment chart 601 can be scanned by ADF reading, based on the physical properties of the sheet. If the CPU 114 determines that the printed adjustment chart 601 can be scanned by ADF reading, the CPU 114 controls a screen display so that the user can arbitrarily select either of "scanning by ADF reading" and "scanning by pressing plate reading" to perform automatic adjustment of the printing position. On the other hand, if the CPU 114 determines that the printed adjustment chart 601 cannot be scanned by ADF reading, the CPU 114 controls a screen display so that the user can arbitrarily select "scanning by pressing plate reading" to perform automatic adjustment of the printing position, but not "scanning by ADF reading". In the first exemplary embodiment, a method for adjusting the printing position is thus appropriately presented to the user based on the physical properties of the sheet on which the adjustment chart 601 is printed.

A detailed description will be given below.

Figure 9:
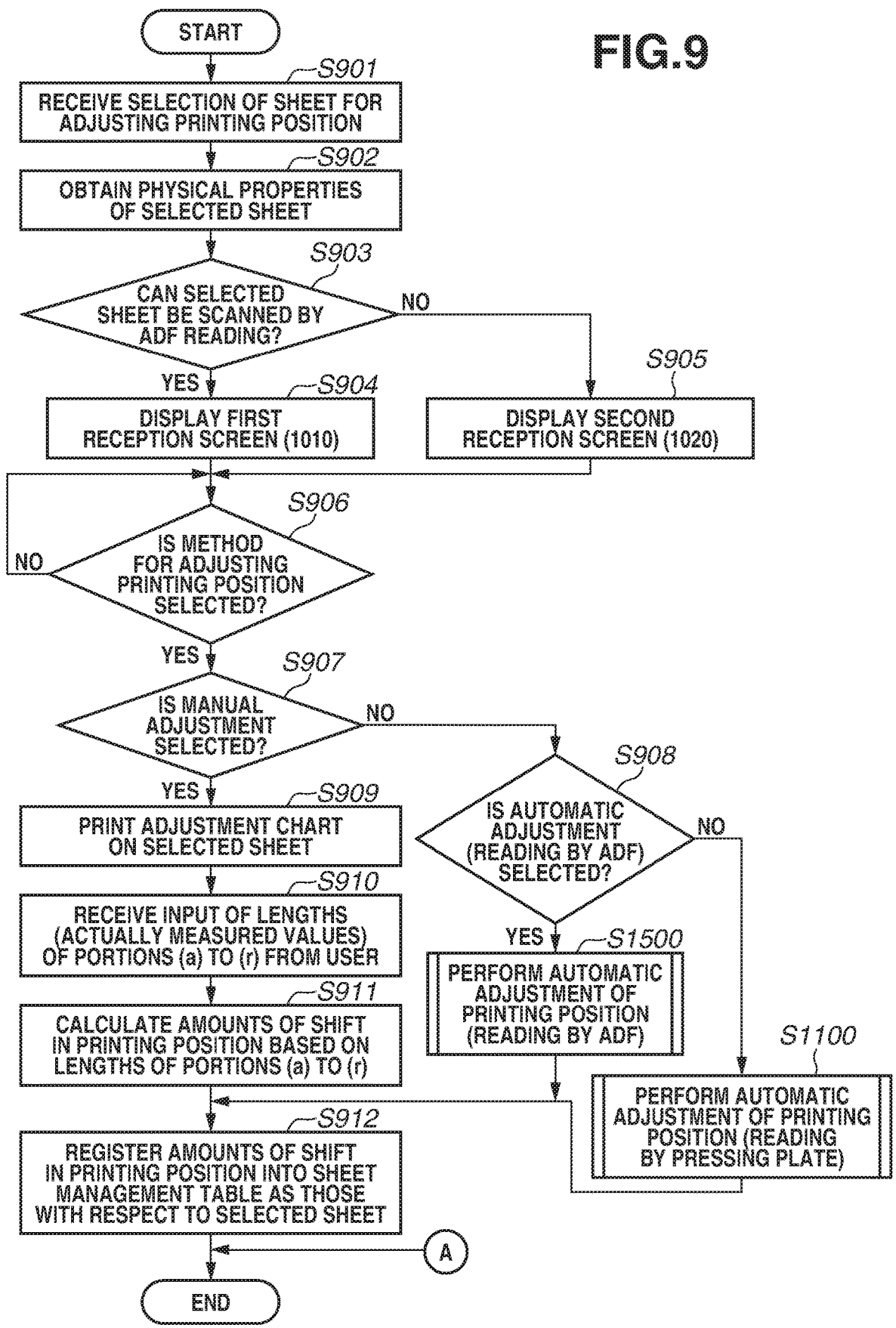
FIG. 9 is a flowchart illustrating a control example according to a first exemplary embodiment.

A series of processing by which the printing apparatus 100 according to the first exemplary embodiment adjusts the printing position will be described with reference to the flowchart illustrated in FIG. 9. Such processing is performed by the CPU 114 of the controller unit 110 executing a control program that is read from the ROM 112 or the HDD 115 and loaded into the RAM 113. The processing in FIG. 9 is started, for example, in a state where the editing screen 500 illustrated in FIG. 5A is displayed on the displaying unit of the operation unit 120.

In step S901, the CPU 114 receives selection of a sheet for adjusting the printing position from the user on the editing screen 500. Then, the processing proceeds to step S902. If the user presses the button 503 with a sheet highlighted on the editing screen 500, the highlighted sheet is selected as the sheet for adjusting the printing position.

In step S902, the CPU 114 obtains the physical properties (e.g., the sheet length in the sub scanning direction 412, the sheet length in the main scanning direction 413, the grammage of the sheet 414, and the surface property of the sheet 415) of the sheet selected in step S901. Then, the processing proceeds to step S903. In addition, the CPU 114 obtains the physical properties of the sheet selected in step S901 by referring to the attribute data (sheet lengths, grammage, and surface property) of the sheet registered in the sheet management table 400.

In step S903, the CPU 114 determines whether the sheet selected in step S901 (i.e., the sheet for adjusting the printing position) can be scanned by ADF reading. The CPU 114 determines whether the sheet can be scanned by ADF reading, based on the physical properties of the sheet obtained in step S902.

For example, if the length of the sheet in the main scanning direction is greater than a maximum guide width of the document stacking unit 340 of the ADF, the sheet cannot be set on the document stacking unit 340. Therefore, the CPU 114 determines that the sheet cannot be scanned by ADF reading.

A specific example will be described here. The length of a sheet of "A3 size" in the main scanning direction is 297 mm. If the document stacking unit 340 has a maximum guide width of 297 mm, a sheet of "12×18 size" having a length of 304.8 mm in the main scanning direction or a sheet of "13×19 size" having a length of 330.2 mm in the main scanning direction is unable to be set on the document stacking unit 340. A sheet of "12×18" size and a sheet of "13×19" size can be stored in a sheet holding unit such as a sheet feeding cassette, a sheet feeding deck, and a manual tray, and therefore images can be printed on such sheets. Thus, there are sizes of sheets that are printable by the image forming unit 151 but not able to be scanned by ADF reading.

For example, if a sheet has a grammage beyond the range of grammage supported as being capable of scanning by ADF reading, the sheet corresponds to a parameter condition that can cause a jam on the conveyance path of the ADF. Therefore, the CPU 114 determines that the sheet cannot be scanned by ADF reading.

A specific example will be described here. If the range of grammage supported as being capable of scanning by ADF reading is 64 g/m$^2$ to 150 g/m$^2$, a sheet having a grammage of 181 g/m$^2$ cannot be scanned by ADF reading.

For example, if the type of the sheet is "tab paper" or "cardboard", the stiffness of the sheet is so high (i.e., the sheet is so stiff) that a jam can occur on the conveyance path of the ADF. For example, if the type of the sheet is "overhead projector (OHP) sheet" or "transparent film", the stiffness of the sheet is so low (i.e., the sheet is so soft) that a jam can occur on the conveyance path of the ADF. If the type of the sheet is a specific one (e.g., "tab paper", "cardboard", "OHP sheet", and "transparent film"), the CPU 114 determines that the sheet cannot be scanned by ADF reading.

As a result of the determination in step S903, if the CPU 114 determines that the sheet can be scanned by ADF reading (YES in step S903), the processing proceeds to step S904. On the other hand, if the CPU 114 determines that the sheet cannot be scanned (NO in step S903), the processing proceeds to step S905.

In step S904, the CPU 114 displays a selection screen 1010 (also referred to as a first reception screen) illustrated in FIG. 10A on the displaying unit of the operation unit 120. Then, the processing proceeds to step S906. The selection screen 1010 is a screen for allowing the user to select one from among performing automatic adjustment of the adjustment chart 601 by pressing plate reading 1001, performing automatic adjustment by ADF reading 1002, and manual adjustment 1003 as a method for adjusting the printing position.

In step S905, the CPU 114 displays a selection screen 1020 (also referred to as a second reception screen) illustrated in FIG. 10B on the displaying unit of the operation unit 120. Then, the processing proceeds to step S906. The selection screen 1020 is a screen for allowing the user to select either performing automatic adjustment of the adjustment chart 601 by pressing plate reading 1001 or manual adjustment 1003 as a method for adjusting the printing position. Unlike the selection screen 1010, the selection screen 1020 is configured so that the user cannot give an instruction to perform automatic adjustment of the adjustment chart 601 by ADF reading. While FIG. 10B illustrates the selection screen 1020 where the button 1002 is hidden, the button 1002 may be displayed by a gray-out display. A warning message (not illustrated) that "the automatic adjustment of the adjustment chart 601 cannot be performed by ADF reading" may be further displayed over the selection screen 1020.

In step S906, the CPU 114 determines whether a method for adjusting the printing position is selected by the user on either of the selection screens 1010 and 1020. If any one of the buttons 1001, 1002, and 1003 on the selection screen 1010 and the buttons 1001 and 1003 on the selection screen 1020 is pressed (YES in step S906), the processing proceeds to step S907. If none of the buttons 1001, 1002, and 1003 on the selection screen 1010 and the buttons 1001 and 1003 on the selection screen 1020 is pressed (NO in step S906), the processing of step S906 is repeated.

In step S907, the CPU 114 determines whether manual adjustment is selected by the user as the method for adjusting the printing position. If the button 1003 on the selection screen 1010 or the button 1003 on the selection screen 1020 is pressed (YES in step S907), the processing proceeds to step S909. On the other hand, if the button 1001 or 1002 on the selection screen 1010 or the button 1001 on the selection screen 1020 is pressed (NO in step S906), the processing proceeds to step S908.

In step S908, the CPU 114 determines whether automatic adjustment (reading by ADF) is selected by the user as the method for adjusting the printing position. If the button 1002 on the selection screen 1010 is pressed (YES in step S908), the processing proceeds to step S1500. In step S1500, the CPU 114 performs automatic adjustment of the printing position by scanning the adjustment chart 601 by ADF reading. Then, the processing proceeds to step S912. Details of the processing of step S1500 will be described below with reference to FIG. 12.

On the other hand, if the button 1001 on the selection screen 1010 or the button 1001 on the selection screen 1020 is pressed (NO in step S908), the CPU 114 determines it to be "NO" and the processing proceeds to step S1100. In step S1100, the CPU 114 performs automatic adjustment of the printing position by scanning the adjustment chart 601 by pressing plate reading. Then, the processing proceeds to step S912. Details of the processing of step S1100 will be described below with reference to FIG. 11.

In step S909, the CPU 114 instructs the image forming unit 151 to print the adjustment chart 601 on the sheet selected in step S901. Receiving the print instruction, the image forming unit 151 prints the adjustment chart 601 on the selected sheet fed from the feeding unit 140. The sheet on which the adjustment chart 601 is printed is discharged from the printing apparatus 100. After the processing of step S909, the processing proceeds to step S910.

In step S910, the CPU 114 receives input of the lengths (actually measured values) of the portions (a) to (r) manually measured from the user on the editing screen 510 illustrated in FIG. 5B. Then, the processing proceeds to step S911.

In step S911, the CPU 114 calculates the amounts of shift in the printing position 712 based on the lengths of the portions (a) to (r) input in step S910. Then, the processing proceeds to step S912. The amounts of shift in the printing position 712 are calculated by using the formulas described above with reference to FIG. 7.

In step S912, the CPU 114 registers the amounts of shift in the printing position 712 into the sheet management table 400 as those with respect to the sheet selected on the editing screen 500. For example, in step S912, the lead positions, side positions, main scanning magnifications, and sub scanning magnifications are registered as information indicating the amounts of shift in the printing position on the front surface 420 and the amounts of shift in the printing position on the back surface 421 with respect to the sheet selected in step S901. After the processing of step S912, the series of processing related to FIG. 9 ends.

That is the details of the series of processing for adjusting the printing position (FIG. 9).

Figure 11:
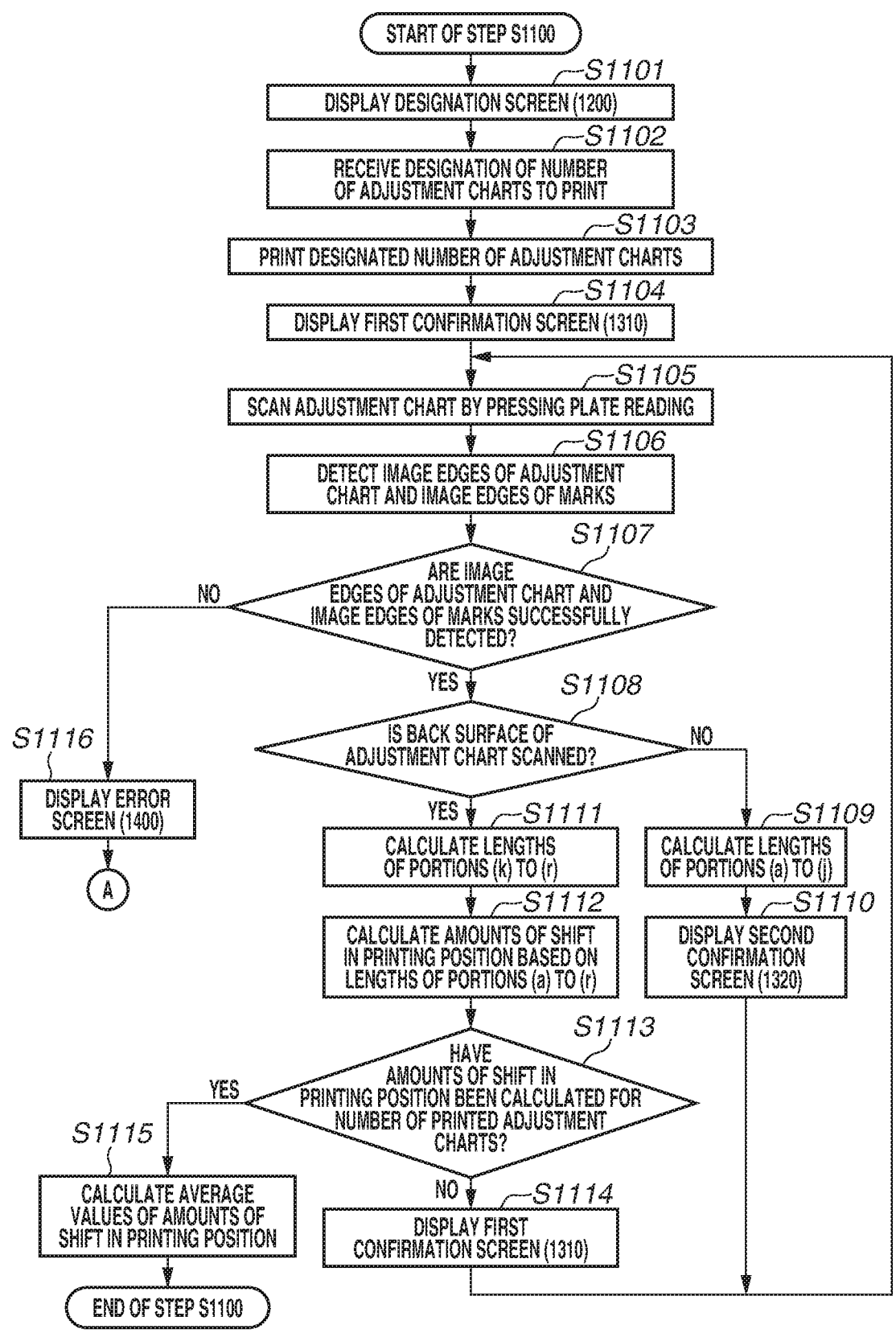
FIG. 11 is a flowchart illustrating a control example according to the first exemplary embodiment.

Next, a series of processing for performing automatic adjustment of the printing position by scanning the adjustment chart 601 by pressing plate reading will be described with reference to the flowchart illustrated in FIG. 11. Such processing is performed by the CPU 114 of the controller unit 110 executing a control program that is read from the ROM 112 or the HDD 115 and loaded into the RAM 113.

Figure 12:
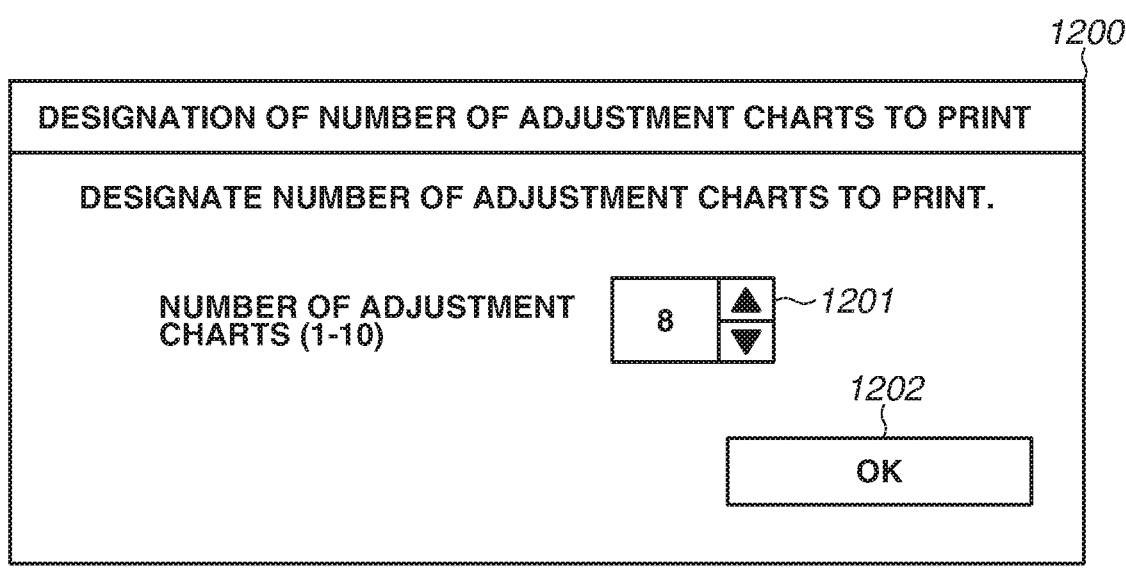
FIG. 12 is a diagram illustrating a configuration of a screen according to the first exemplary embodiment.

In step S1101, the CPU 114 displays a designation screen 1200 illustrated in FIG. 12 on the displaying unit of the operation unit 120. Then, the processing proceeds to step S1102. The designation screen 1200 is a screen for receiving designation of the number of adjustment charts 601 to print for adjusting the printing position from the user. A plurality (e.g., ten) of adjustment charts 601 can be scanned and the amounts of shift in the printing position can be averaged to increase the accuracy of the amounts of shift in the printing position. Therefore, the user designates, on the designation screen 1200, the number of adjustment charts 601 to print for adjusting the printing position.

In step S1102, the CPU 114 receives the designation of the number of adjustment charts 601 to print from the user on the designation screen 1200. Then, the processing proceeds to step S1103.

In step S1103, the CPU 114 instructs the image forming unit 151 to print the adjustment charts 601 as many as designated in step S1102. At that time, the image data of the adjustment chart 601 is read from the RAM 113 or the HDD 115 and transferred to the printer engine 150. Receiving the print instruction, the image forming unit 151 prints the adjustment chart 601 on the sheets fed from the feeding unit 140 (i.e., the sheet selected in step S901). The sheets on which the adjustment chart 601 is printed are discharged from the printing apparatus 100. After the processing of step S1103, the processing proceeds to step S1104.

In step S1104, the CPU 114 displays a confirmation screen 1310 (referred to as a first confirmation screen) illustrated in FIG. 13A on the displaying unit of the operation unit 120. The confirmation screen 1310 is a screen for prompting the user to set an adjustment chart 601 on the platen glass 302 (document positioning plate) so that the images on the front surface of the adjustment chart 601 are read. If the user presses a button 1311 (start reading button) on the confirmation screen 1310, the processing proceeds to step S1105.

In step S1105, the CPU 114 instructs the scanner unit 130 to scan the adjustment chart 601 printed in step S1103 by pressing plate reading. Then, the processing proceeds to step S1106.

In step S1106, the CPU 114 performs image analysis on image data generated by scanning the adjustment chart 601. The CPU 114 performs the image analysis on the image data by the method described above with reference to FIGS. 8A and 8B. Based on the image analysis, the CPU 114 detects the image edges of the adjustment chart 601 and the image edges of the marks 620, focusing on a difference in density. Then, the processing proceeds to step S1107.

In step S1107, the CPU 114 determines whether the image edges of the adjustment chart 601 and the image edges of the marks 620 are successfully detected as a result of the detection processing in step S1106. If the CPU 114 determines that the detection has succeeded (YES in step S1107), the processing proceeds to step S1108. On the other hand, if the CPU 114 determines that the detection has failed (NO in step S1107), the processing proceeds to step S1116. Examples of the case where the CPU 114 determines it to be "NO" in step S1107 include a case where a difference in density between the background of the sheet on which the adjustment chart 601 is printed and the marks 620 is so small that the image edges of the marks 620 fail to be properly detected.

In step S1108, the CPU 114 determines whether the back surface of the adjustment chart 601 is scanned by the scan processing in step S1105. The CPU 114 can determine which side of surface of the adjustment chart 601 is scanned, the front surface or back surface, by performing image analysis on the image data based on the image 612 or 613 for identifying the front or back surface of the adjustment chart 601. If the CPU 114 determines that the back surface is scanned (YES in step S1108), the processing proceeds to step S1111. On the other hand, if the CPU 114 determines that the back surface is not scanned (NO in step S1108), the processing proceeds to step S1109.

In step S1109, the CPU 114 calculates the lengths of the portions (a) to (j) illustrated in FIG. 6 from the image edges of the adjustment chart 601 and the image edges of the marks 620 detected in step S1106. Then, the processing proceeds to step S1110.

In step S1110, the CPU 114 displays a confirmation screen 1320 (referred to as a second confirmation screen) illustrated in FIG. 13B on the displaying unit of the operation unit 120. The confirmation screen 1320 is a screen for prompting the user to set the adjustment chart 601 on the platen glass 302 (document positioning plate) so that the images on the back surface of the adjustment chart 601 are read. If the user presses a button 1321 (start reading button) on the confirmation screen 1320, the processing returns to step S1105 and the CPU 114 continues the subsequent processing.

In step S1111, the CPU 114 calculates the lengths of the portions (k) to (r) illustrated in FIG. 6 from the image edges of the adjustment chart 601 and the image edges of the marks 620 detected in step S1106. Then, the processing proceeds to step S1112.

In step S1112, the CPU 114 calculates the amounts of shift in the printing position 712 based on the lengths of the portions (a) to (j) calculated in step S1109 and the lengths of the portions (k) to (r) calculated in step S1111. Then, the processing proceeds to step S1113. The amounts of shift in the printing position 712 are calculated by using the formulas described above with reference to FIG. 7.

In step S1113, the CPU 114 determines whether the amounts of shift in the printing position have been calculated for the number of printed adjustment charts 601 (i.e., the number of adjustment charts 601 designated in step S1102). The CPU 114 performs the determination processing of step S1113 by storing the number of times of processing of step S1112 into the HDD 115 or the RAM 113 as a counter, and comparing the value of the stored counter with the number of adjustment charts 601 designated in step S1102. As a result of the determination in step S1113, if the CPU 114 determines it to be "YES" (YES in step S1113), the processing proceeds to step S1115. On the other hand, if the CPU 114 determines it to be "NO" (NO in step S1113), the processing proceeds to step S1114.

In step S1114, the CPU 114 displays the confirmation screen 1310 (first confirmation screen) illustrated in FIG. 13A on the displaying unit of the operation unit 120. If the user presses the button 1311 (start reading button) on the confirmation screen 1310, the processing returns to step S1105 and the CPU 114 continues the subsequent processing.

In step S1115, the CPU 114 calculates average values of the amounts of shift in the printing position for the number of printed adjustment charts 601, based on the amounts of shift in the printing position calculated in step S1112. The CPU 114 then determines the average values calculated in step S1115 to be the amounts of shift in the printing position with respect to the sheet selected in step S901 of FIG. 9. After the processing of step S1115, the series of processing related to FIG. 11 ends. Then, the processing proceeds to step S912 of FIG. 9.

Figure 14:
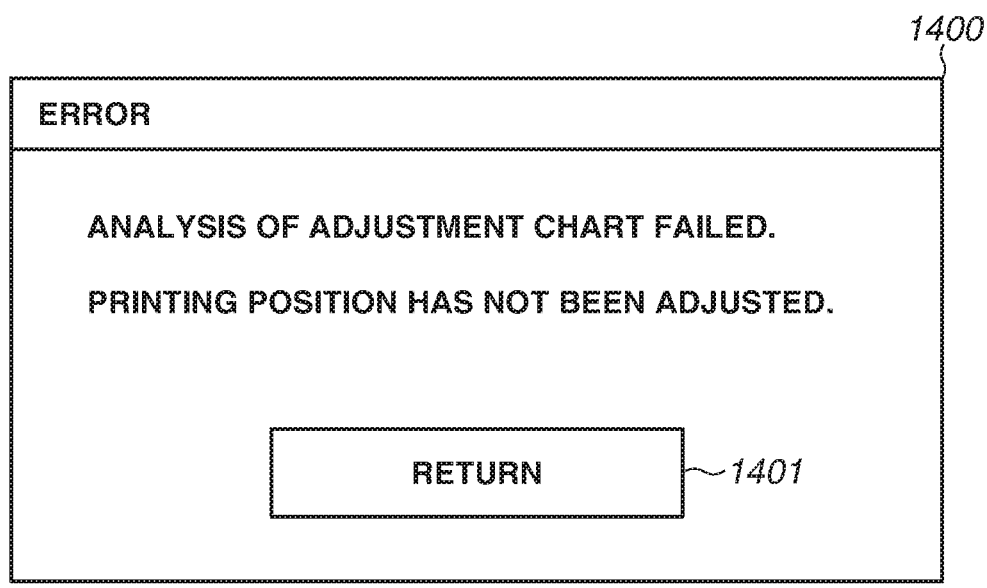
FIG. 14 is a diagram illustrating a configuration of a screen according to the first exemplary embodiment.

In step S1116, the CPU 114 displays an error screen 1400 illustrated in FIG. 14 on the displaying unit of the operation unit 120. The error screen 1400 is a screen for notifying the user that the analysis of the image data on the adjustment chart 601 failed and the printing position has not been adjusted. After the processing of step S1116, the series of processing related to FIG. 11 ends and the series of processing related to FIG. 9 ends.

That is the details of the series of processing (step S1100 in FIG. 11) for performing automatic adjustment of the printing position by scanning the adjustment chart 601 by pressing plate reading.

Figure 15:
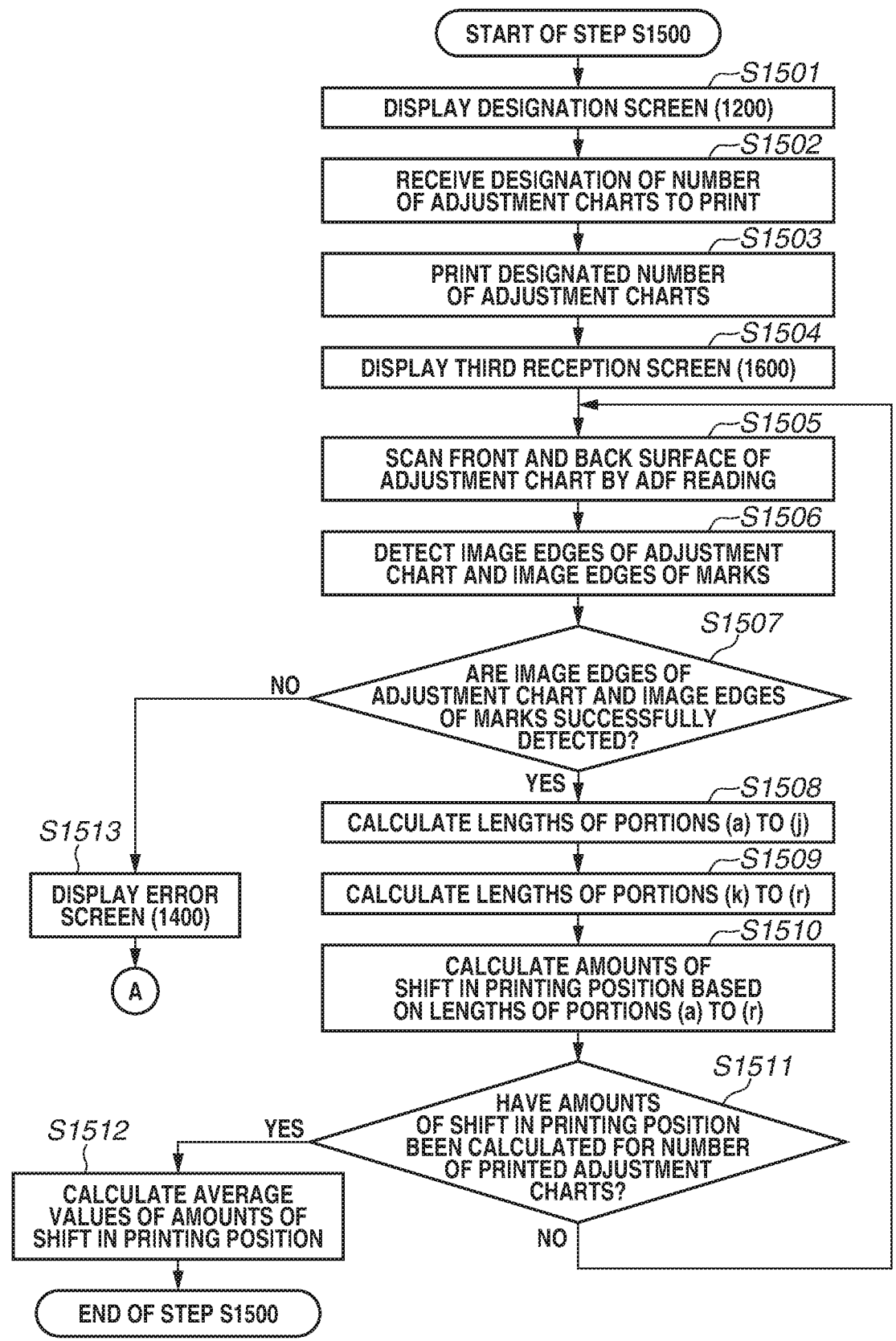
FIG. 15 is a flowchart illustrating a control example according to the first exemplary embodiment.

Next, a series of processing for performing automatic adjustment of the printing position by scanning the adjustment chart 601 by ADF reading will be described with reference to the flowchart illustrated in FIG. 15. The processing is performed by the CPU 114 of the controller unit 110 executing a control program that is read from the ROM 112 or the HDD 115 and loaded into the RAM 113.

In step S1501, the CPU 114 displays the designation screen 1200 illustrated in FIG. 12 on the displaying unit of the operation unit 120. Then, the processing proceeds to step S1502.

In step S1502, the CPU 114 receives designation of the number of adjustment charts 601 to print from the user on the designation screen 1200. Then, the processing proceeds to step S1503.

In step S1503, the CPU 114 instructs the image forming unit 151 to print adjustment charts 601 as many as designated in step S1502. At that time, the image data on the adjustment chart 601 is read from the RAM 113 or the HDD 115 and transferred to the printer engine 150. Receiving the print instruction, the image forming unit 151 prints the adjustment chart 601 on the sheets fed from the feeding unit 140 (i.e., the sheet selected in step S901). The sheets on which the adjustment chart 601 is printed are discharged from the printing apparatus 100. After the processing of step S1503, the processing proceeds to step S1504.

Figure 16:
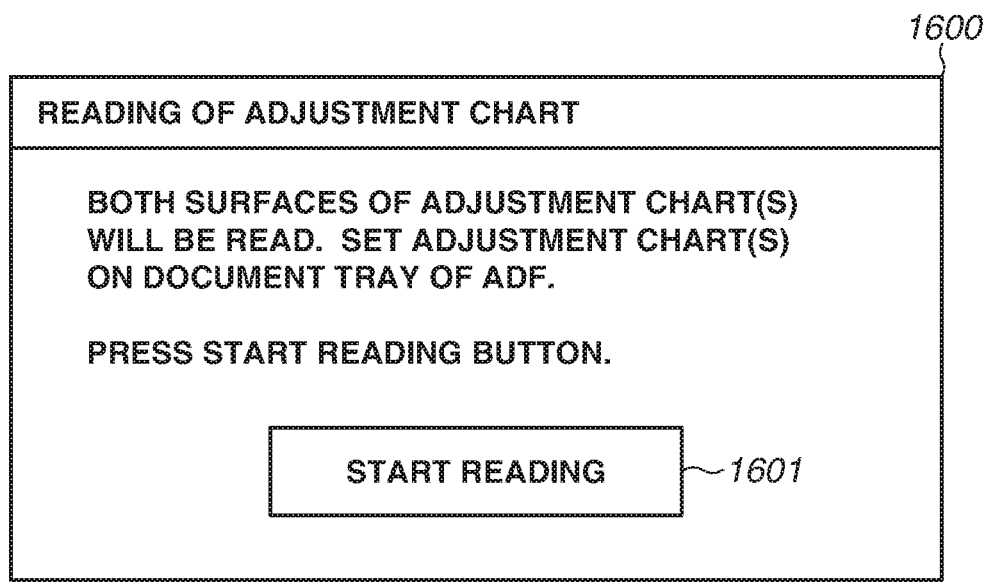
FIG. 16 is a diagram illustrating a configuration of a screen according to the first exemplary embodiment.

In step S1504, the CPU 114 displays a confirmation screen 1600 (referred to as a third reception screen) illustrated in FIG. 16 on the displaying unit of the operation unit 120. The confirmation screen 1600 is a screen for prompting the user to set the adjustment charts 601 on the document stacking unit 304 (document tray) of the ADF to read the images on the front and back surfaces of the adjustment charts 601. If the user presses a button 1601 (start reading button) on the confirmation screen 1600, the processing proceeds to step S1505.

In step S1505, the CPU 114 instructs the scanner unit 130 to scan the front and back surfaces of the adjustment chart 601 printed in step S1503 by ADF reading. Then, the processing proceeds to step S1506.

In step S1506, the CPU 114 performs image analysis on image data generated by scanning the front and back surfaces of the adjustment chart 601. The CPU 114 performs the image analysis on the image data by the method described above with reference to FIGS. 8A and 8B. Based on the image analysis, the CPU 114 detects the image edges of the adjustment chart 601 (front and back surfaces) and the image edges of the marks 620, focusing on a difference in density. The processing proceeds to step S1507.

In step S1507, the CPU 114 determines whether the image edges of the adjustment chart 601 (front and back surfaces) and the image edges of the marks 620 are successfully detected as a result of the detection processing of step S1506. If the image edges are determined to be successfully detected (YES in step S1507), the processing proceeds to step S1508. On the other hand, if it is determined that the detection has failed (NO in step S1507), the processing proceeds to step S1513. Examples of the case where the CPU 114 determines it to be "NO" in step S1507 include where a difference in density between the background of the sheet on which the adjustment chart 601 is printed and the marks 620 is so small that the image edges of the marks 620 fail to be properly detected.

In step S1508, the CPU 114 calculates the lengths of the portions (a) to (j) illustrated in FIG. 6 from the image edges of the adjustment chart 601 (front surface) and the image edges of the marks 620 detected in step S1506. Then, the processing proceeds to step S1509.

In step S1509, the CPU 114 calculates the lengths of the portions (k) to (r) illustrated in FIG. 6 from the image edges of the adjustment chart 601 (back surface) and the image edges of the marks 620 detected in step S1506. Then, the processing proceeds to step S1510.

In step S1510, the CPU 114 calculates the amounts of shift in the printing position 712 based on the lengths of the portions (a) to (j) calculated in step S1508 and the lengths of the portions (k) to (r) calculated in step S1509. Then, the processing proceeds to step S1511. The amounts of shift in the printing position 712 are calculated by using the formulas described above with reference to FIG. 7.

In step S1511, the CPU 114 determines whether the amounts of shift in the printing position have been calculated for the number of printed adjustment charts 601 (i.e., the number of adjustment charts 601 designated in step S1502). The CPU 114 performs the determination processing of step S1511 by storing the number of times of processing of step S1511 into the HDD 115 or the RAM 113 as a counter, and comparing the value of the stored counter with the number of adjustment charts 601 designated in step S1502. As a result of the determination in step S1511, if the CPU 114 determines it to be "YES" (YES in step S1511), the processing proceeds to step S1512. On the other hand, if the CPU 114 determines it to be "NO" (NO in step S1511), the processing returns to step S1505 and the CPU 114 continues the subsequent processing.

In step S1512, the CPU 114 calculates the average values of the amounts of shift in the printing position for the number of printed adjustment charts 601 based on the amounts of shift in the printing position calculated in step S1510. The CPU 114 then determines the average values calculated in step S1512 to be the amounts of shift in the printing position with respect to the sheet selected in step S901 of FIG. 9. After the processing of step S1512, the series of processing related to FIG. 15 ends. Then, the processing proceeds to step S912 of FIG. 9.

In step S1513, the CPU 114 displays the error screen 1400 illustrated in FIG. 14 on the displaying unit of the operation unit 120. After the processing of step S1513, the series of processing related to FIG. 15 ends and the series of processing related to FIG. 9 ends.

That is the details of the series of processing (step S1500 in FIG. 15) for performing automatic adjustment of the printing position by scanning the adjustment chart 601 by ADF reading.

As described above, in the first exemplary embodiment, the CPU 114 instructs the image forming unit 151 to print the adjustment chart 601 on a sheet for adjusting a shift in the printing position. Then, the CPU 114 determines whether the printed adjustment chart 601 can be scanned by ADF reading, based on the physical properties of the sheet. If the CPU 114 determines that the printed adjustment chart 601 can be scanned by ADF reading, the CPU 114 controls a screen display so that the user can arbitrarily select either of "scanning by ADF reading" and "scanning by pressing plate reading" to perform automatic adjustment of the printing position. On the other hand, if the CPU 114 determines that the printed adjustment chart 601 cannot be scanned by ADF reading, the CPU 114 controls a screen display so that the user can arbitrarily select "scanning by pressing plate reading" to perform automatic adjustment of the printing position, but not "scanning by ADF reading". In this way, according to the first exemplary embodiment, a method for adjusting the printing position can be appropriately presented to the user based on the physical properties of the sheet on which the adjustment chart 601 is printed. In particular, if a plurality of adjustment charts 601 is to be scanned to improve the accuracy of the amounts of shift in the printing position, the user can easily check whether the adjustment charts 601 can be scanned by ADF reading. This improves the user's convenience.

Figure 17:
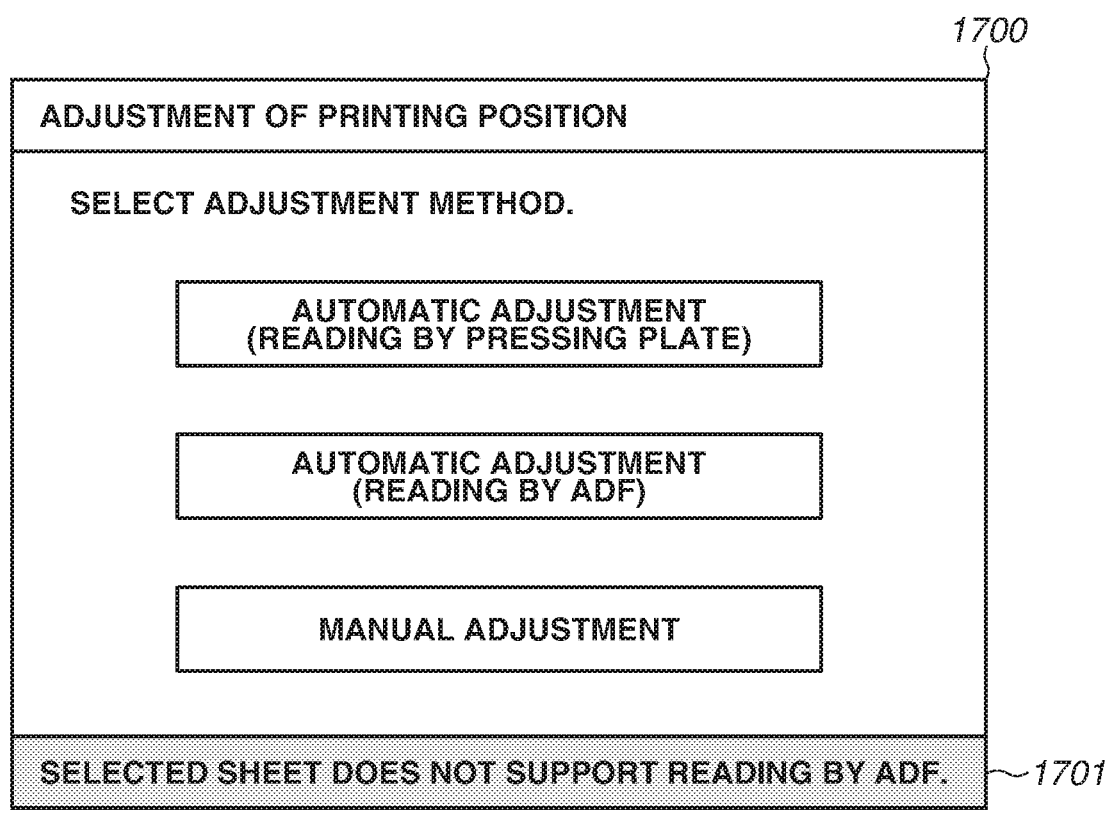
FIG. 17 is a diagram illustrating a configuration of a screen according to another exemplary embodiment.

In the first exemplary embodiment, the case is described in which the CPU 114 controls, if it is determined that the printed adjustment chart 601 cannot be scanned by ADF reading, a screen display as illustrated in FIG. 10B so that the user cannot select "scanning by ADF reading". However, it is not limited thereto. In another embodiment, the CPU 114 displays a selection screen 1700 illustrated in FIG. 17 on the displaying unit of the operation unit 120 instead of the selection screen 1020 illustrated in FIG. 10B. More specifically, even if it is determined that the printed adjustment chart 601 cannot be scanned by ADF reading, the CPU 114 may allow the user to select "scanning by ADF reading" after notifying the user of a warning 1701 that ADF reading is not supported.

The present invention is not limited to the above-described exemplary embodiments. Various modifications (including organic combinations of the exemplary embodiments) may be made based on the gist of the present invention, and such modifications are not intended to be excluded from the scope of the present invention.

For example, in the above-described exemplary embodiments, the CPU 114 of the controller unit 110 of the printing apparatus 100 serves as the main constituent for the above-described various controls. However, it is not limited thereto. A print controlling unit such as an external controller in a housing separate from the printing apparatus 100 may be configured to be able to perform part or all of the above-described various controls.

The exemplary embodiments to which the present invention is applied are described by using the printing apparatus 100 including the image forming unit 151 that uses monochrome toner. However, it is not limited thereto. The exemplary embodiments to which the present invention is applied can be a color printing apparatus 100 including an image forming unit 151 that uses toners of a plurality of colors. For example, if a full-color printing apparatus 100 uses four colors of cyan (C), magenta (M), yellow (Y), and black (K), the printing apparatus 100 may adjust a printing position by using black toner. The printing positions of the other colors may be adjusted with reference to the printing position of black.

While various examples and exemplary embodiments of the present invention have been described above, the gist and scope of the present invention are not limited to the specific descriptions in this specification document.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
a platen on which a document is to be placed;
a tray on which a document is to be placed;
a document feeder configured to feed the document from the tray;
a reader configured to read the document placed on the platen, and configured to read the document fed from the tray by the document feeder;
an image former configured to form an image based on an image forming condition;
a display;
a controller configured to:
obtain information relating to a type of a sheet on which a test image is to be formed;
control the display based on the information;
control the image former to form the test image on the sheet based on the information;
control the reader to read the test image formed on the sheet placed on the platen;
control the document feeder and the reader to read the test image formed on the sheet while conveying the sheet on the tray; and
generate the image forming condition based on a reading result related to the test image output from the reader,
wherein in a case where the test image is formed on a sheet of a first type, the controller controls the display to display a first screen for prompting a user to place the sheet on which the test image is formed on the platen, and
wherein in a case where the test image is formed on a sheet of a second type different from the first type, the controller controls the display to display a second screen for prompting a user to place the sheet on which the test image is formed on the tray.

2. The image forming apparatus according to claim 1, wherein the image forming condition is used for adjusting a printing position at which an image is to be formed on the sheet.

3. The image forming apparatus according to claim 1, wherein the sheet of the first type includes a sheet of a predetermined size, and the sheet of the second type does not include a sheet of the predetermined size.

4. The image forming apparatus according to claim 1, wherein the sheet of the first type includes a sheet of a first size and a sheet of a second size smaller than the first size, and the sheet of the second type does not include a sheet of the first size but includes a sheet of the second size.

5. The image forming apparatus according to claim 1, wherein the sheet of the first type includes a sheet larger than predetermined grammage, and the sheet of the second type does not include a sheet larger than the predetermined grammage.

6. The image forming apparatus according to claim 1, wherein the sheet of the first type includes a sheet of first grammage and a sheet of second grammage, and the sheet of the second type does not include a sheet of the first grammage but includes a sheet of the second grammage.

7. The image forming apparatus according to claim 1, wherein the sheet of the first type includes a sheet smaller than another predetermined grammage, and the sheet of the second type does not include a sheet smaller than the another predetermined grammage.

8. The image forming apparatus according to claim 1, wherein the sheet of the first type includes a sheet of first grammage and a sheet of second grammage larger than the first grammage, and the sheet of the second type does not include a sheet of the first grammage but includes a sheet of the second grammage.

9. The image forming apparatus according to claim 1, wherein the sheet of the second type includes a tab sheet.

10. The image forming apparatus according to claim 1, wherein the sheet of the second type includes cardboard.

11. The image forming apparatus according to claim 1, wherein the sheet of the second type includes an overhead projector sheet.

12. The image forming apparatus according to claim 1, wherein the sheet of the second type includes a transparent film.

* * * * *